US012663107B2

(12) United States Patent
Daigle et al.

(10) Patent No.: US 12,663,107 B2
(45) Date of Patent: Jun. 23, 2026

(54) FLEXIBLE JOINT ASSEMBLY

(71) Applicant: Victaulic Company, Easton, PA (US)

(72) Inventors: Damian Daigle, Whitehall, PA (US);
Christopher Albright, Allentown, PA
(US)

(73) Assignee: VICTAULIC COMPANY, Easton, PA
(US)

( * ) Notice: Subject to any disclaimer, the term of this
patent is extended or adjusted under 35
U.S.C. 154(b) by 0 days.

(21) Appl. No.: 19/042,271

(22) Filed: Jan. 31, 2025

(65) Prior Publication Data

US 2025/0251065 A1 Aug. 7, 2025

Related U.S. Application Data

(60) Provisional application No. 63/549,004, filed on Feb.
2, 2024.

(51) Int. Cl.
F16L 27/073 (2006.01)
F16L 27/02 (2006.01)
F16L 27/12 (2006.01)

(52) U.S. Cl.
CPC .................................. F16L 27/073 (2013.01)

(58) Field of Classification Search
CPC . F16L 27/073; F16L 27/026; F16L 27/12751;
F16L 27/053; F16L 27/06
See application file for complete search history.

(56) References Cited

U.S. PATENT DOCUMENTS

| | | | |
|---|---|---|---|
| 2,516,743 A | 7/1950 | Allin | |
| 2,845,283 A | 7/1958 | Kuhn | |
| 3,177,017 A | 4/1965 | Guildner et al. | |
| 3,178,207 A | 4/1965 | Zola et al. | |
| 3,396,992 A | 8/1968 | Jesse | |
| 3,649,052 A * | 3/1972 | Snyder, Jr. .......... | F16L 27/0816 285/38 |
| 4,252,347 A * | 2/1981 | Weinhold ................ | F16L 27/04 285/263 |
| 4,659,116 A * | 4/1987 | Cameron ............ | F16L 19/0206 285/332.1 |
| 5,029,906 A * | 7/1991 | Chelette ................ | E21B 17/042 285/924 |
| 5,131,689 A | 7/1992 | Bates | |

(Continued)

FOREIGN PATENT DOCUMENTS

| | | |
|---|---|---|
| CN | 103075593 A | 5/2013 |
| CN | 103482075 A | 1/2014 |

(Continued)

*Primary Examiner* — James M Hewitt, II
(74) *Attorney, Agent, or Firm* — Ballard Spahr LLP

(57) ABSTRACT

A flexible joint is used to accommodate dynamic movement
such as settlement, seismic and thermal movements. A
portion of an outer surface of a ring is surrounded by a
sleeve. A coupling attaches the sleeve to the ring. The sleeve
is slidably movable on a section of the portion of the outer
surface of the ring. The portion of the outer surface com-
prises first and second grooves, a partial spherical segment,
a first frustoconical segment positioned adjacent the partial
spherical segment and a second frustoconical segment posi-
tioned adjacent the partial spherical segment. The outer
surfaces of the first and second frustoconical segments taper
away from the partial spherical segment.

20 Claims, 16 Drawing Sheets

(56)                    References Cited

U.S. PATENT DOCUMENTS

| | | | |
|---|---|---|---|
| 7,828,339 | B2 | 11/2010 | Dole |
| 8,360,477 | B2 | 1/2013 | Flynn |
| 9,599,262 | B1 | 3/2017 | Moore |
| 2003/0024742 | A1 | 2/2003 | Swietlik et al. |
| 2013/0328307 | A1 | 12/2013 | Irwin et al. |

FOREIGN PATENT DOCUMENTS

| | | | |
|---|---|---|---|
| CN | 110953420 | A | 4/2020 |
| CN | 217714046 | U | 11/2022 |
| EP | 0 121 322 | A1 | 10/1984 |
| FR | 699369 | A | 2/1931 |

* cited by examiner

FLEXIBLE JOINT ASSEMBLY

CROSS REFERENCE TO RELATED APPLICATIONS

This application is based upon and claims benefit of priority to U.S. Provisional Application No. 63/549,004, filed Feb. 2, 2024, which is hereby incorporated by reference herein in its entirety.

FIELD OF THE INVENTION

This invention concerns flexible joint assemblies used to connect pipe elements subjected to differential settlement, seismic activity, or thermal movement.

BACKGROUND

As is well known, pipe lines may be subject to differential settlement, seismic activity, and alternating cycles of heating and cooling. Differential settlement of underground pipe lines may be caused by ground subsidence due to natural processes, for example dissolution of underlying rock or gradual compaction of sediment, or human activities, such as mining or pumping of groundwater or other subsurface substances. Seismic activity may be caused by naturally occurring earthquakes or human activities such as impoundment of reservoirs, mining, and withdrawal of fluids and gas from the subsurface. Heating and cooling may be the result of large variations in ambient or ground temperatures, both daily and seasonal, to which the pipe line is exposed, as well as due to the heat contained in the fluid being pumped through the pipe line. The fluid itself may be hot, or may be heated by pumping action. Friction between the fluid and pipe line may also contribute to the heating and expansion. Stresses caused by differential settlement, seismic activity, and thermal expansion and contraction can damage pipe line. For example, the pipe line may deform or collapse due to shear and bending forces on the pipe line when subjected to differential settlement or seismic activity. Further, the pipe line may buckle when subjected to compression due to expansion in response to an increase in temperature, or, a joint may fail when subjected to tension loads due to pipe line contraction in response to a decrease in temperature.

For long pipe lines subjected to even small temperature variations, settlement or seismic activity, it is advantageous to provide flexible joints at intervals along the length of the pipe line to accommodate dynamic movement, such as differential settlement, seismic movement and thermal movement, to prevent damage to the pipe line which might otherwise occur.

SUMMARY

An example flexible joint comprises a ring surrounding a longitudinal axis and having an outer surface and first and second ends oppositely disposed. The first end of the ring attachable to an end of a center spool. A sleeve surrounds at least a portion of the outer surface of the ring and has an inner surface slidably engageable with a section of the portion of the outer surface of the ring. The portion of the outer surface includes the second end of the ring. A coupling is configured to attach the sleeve to the ring. The portion of the outer surface comprises a partial spherical segment having a longitudinal midpoint. A first frustoconical segment is positioned adjacent a first end of the partial spherical segment. An outer surface of the first frustoconical segment tapers away from the partial spherical segment at a first angle. A second frustoconical segment is positioned adjacent a second end of the partial spherical segment. An outer surface of the second frustoconical segment tapers away from the partial spherical segment at a second angle. A first groove and a second groove are spaced axially apart along the longitudinal axis. The first groove is positioned on a first side of the longitudinal midpoint of the partial spherical segment. The second groove is positioned on a second side of the longitudinal midpoint of the partial spherical segment opposite the first side. The first groove receives a first seal and the second groove receives a second seal. Each groove of the first and second grooves has an inner wall and an outer wall.

An example flexible joint comprises a first ring surrounding a first longitudinal axis and having an outer surface and first and second ends oppositely disposed. The first end of the first ring is attachable to an end of a center spool. A second ring surrounds a second longitudinal axis and has an outer surface and first and second ends oppositely disposed. A sleeve surrounds at least a portion of the outer surface of the first ring and at least a portion of the outer surface of the second ring. The sleeve has an inner surface slidably engageable with a section of the portion of the outer surface of the first ring and a section of the portion of the outer surface of the second ring. The portion of the outer surface of the first ring includes the second end of the first ring and the portion of the outer surface of the second ring includes the second end of the second ring. A first coupling is configured to attach the sleeve to the first ring. A second coupling is configured to attach the sleeve to the second ring. The portion of the outer surface of the first ring and the portion of the outer surface of the second ring each comprises a partial spherical segment having a longitudinal midpoint. A first frustoconical segment is positioned adjacent a first end of the partial spherical segment. An outer surface of the first frustoconical segment tapers away from the partial spherical segment at a first angle. A second frustoconical segment is positioned adjacent a second end of the partial spherical segment. An outer surface of the second frustoconical segment tapers away from the partial spherical segment at a second angle. A first groove and a second groove are spaced axially apart along the longitudinal axis. The first groove is positioned on a first side of the longitudinal midpoint of the partial spherical segment. The second groove is positioned on a second side of the longitudinal midpoint of the partial spherical segment opposite the first side. The first groove receives a first seal and the second groove receives a second seal. Each groove of the first and second grooves has an inner wall and an outer wall.

DETAILED DESCRIPTION

Figure 1:
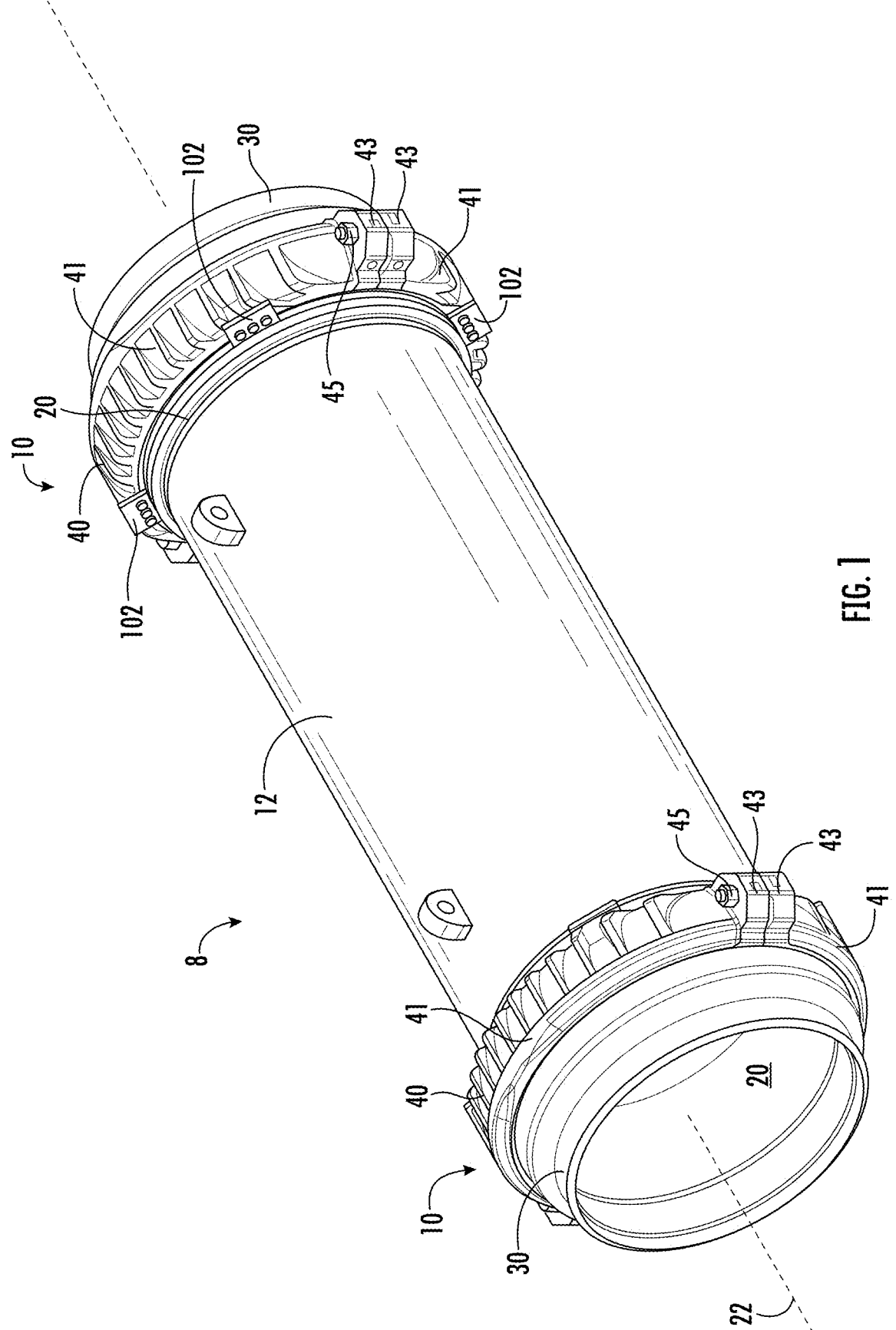
FIG. 1 is a perspective view of an example flexible joint assembly having an example single flexible joint on either end.
Figure 2:
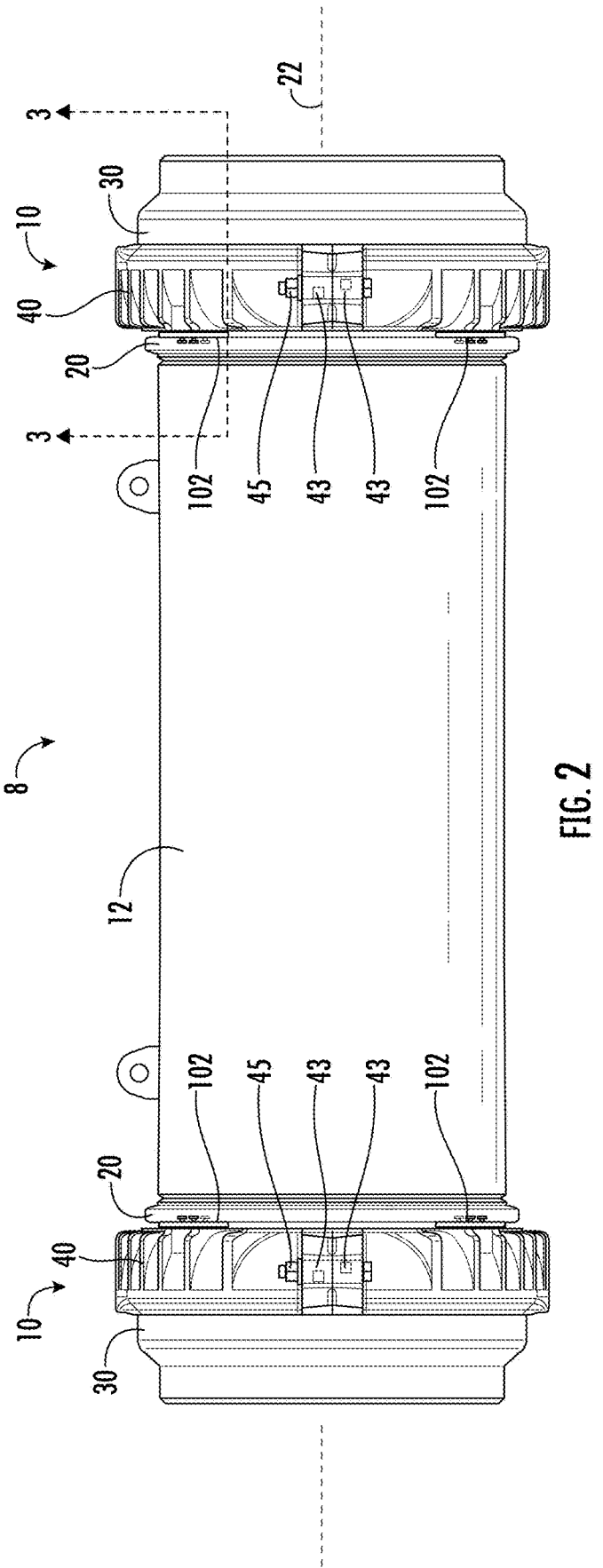
FIG. 2 is a front view of the example flexible joint assembly of FIG. 1.
Figure 3:
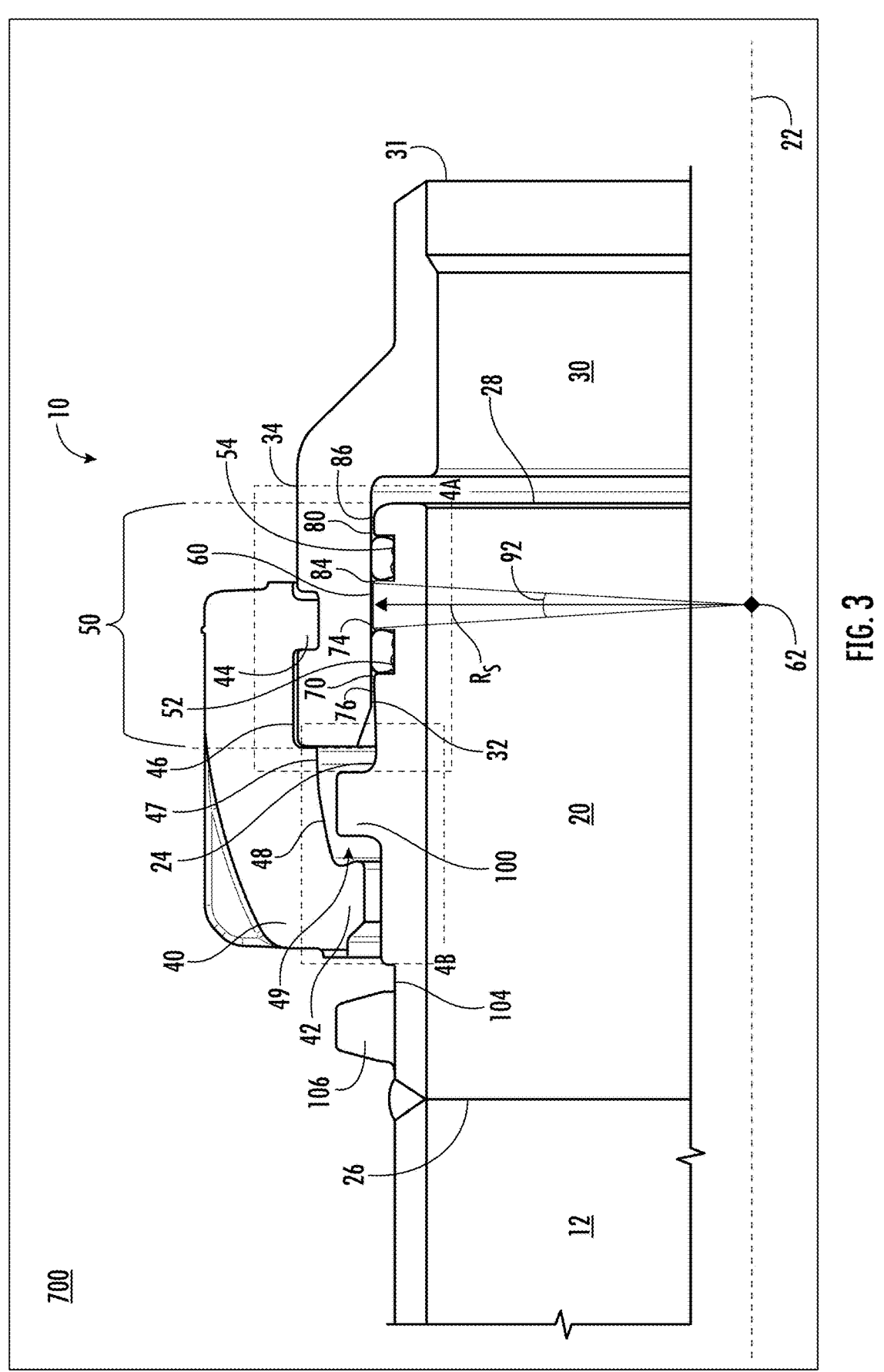
FIG. 3 is a cross sectional view of a portion of the flexible joint assembly of FIG. 2 taken along section line 3-3 in FIG. 2.

FIG. 1 illustrates an example flexible joint assembly 8, comprising flexible joints 10 coupled to either end of a center spool 12. As shown in FIGS. 1 and 2, each flexible joint 10 comprises a ring 20 surrounding a longitudinal axis 22. As shown in FIG. 3, the ring 20 has an outer surface 24 and first and second ends 26, 28 oppositely disposed. The first end 26 of the ring 20 is connected or coupled to an end of the center spool 12.

A sleeve 30 surrounds at least a portion 50 of the outer surface 24 of the ring 20 including the second end 28 of the ring 20. The sleeve 30 has an inner surface 32 slidably and rotatably engageable with a section of the portion 50 of the outer surface 24 of the ring 20. The inner surface 32 of the sleeve 30, which is slidably and rotatably engageable with a section of the portion 50 of the outer surface 24, is cylindrical. The opposite end 31 of sleeve 30 is sized and configured to be connected or coupled to a pipeline (not shown) to which the flexible joint assembly 8 is to be connected. The end 31 of sleeve may have a diameter that is substantially the same as the diameter of the pipeline to which the flexible joint assembly 8 is to be connected and may be prepared with any configuration known to those in the art for effecting that connection, commonly, the end 31 may be grooved for a grooved connection, prepared with a beveled end (as shown in FIG. 3) for a butt-welded connection, or flanged for a flanged connection.

Figure 4A:
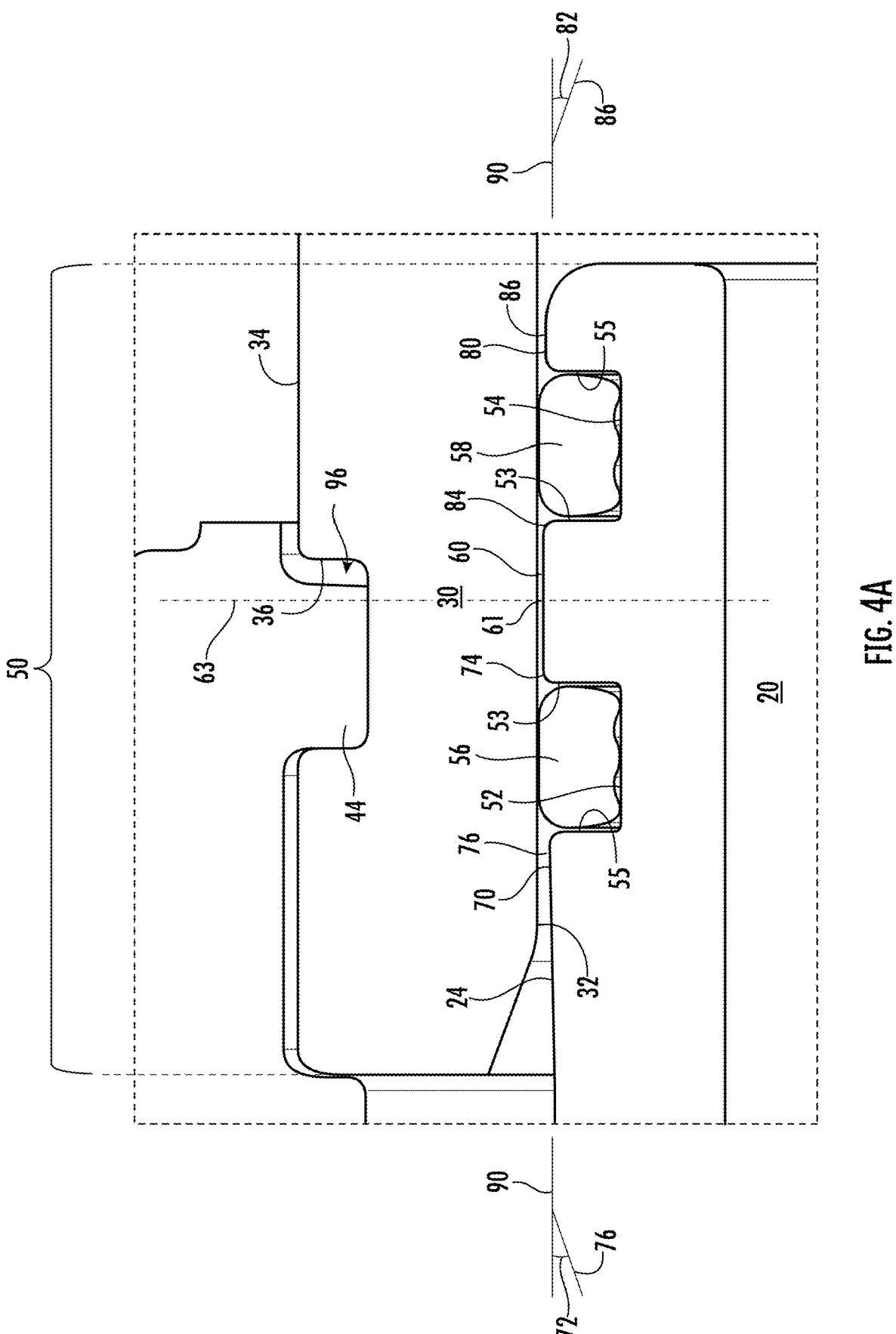
FIG. 4A is a magnified view of area 4A shown in FIG. 3.
Figure 11:
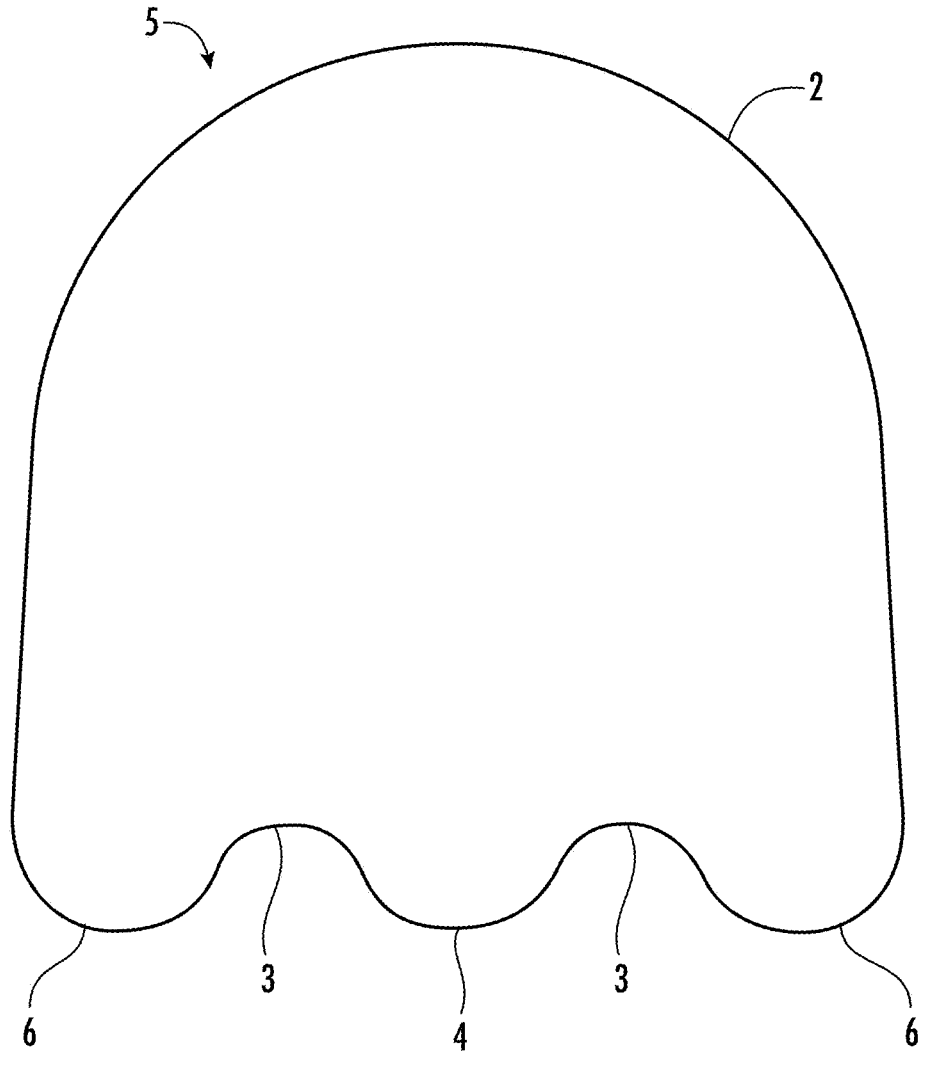
FIG. 11 is a cross sectional view of an example seal.

The portion 50 of the outer surface 24 surrounded by the sleeve 30 comprises first and second grooves 52, 54 spaced axially apart along the longitudinal axis 22. As shown in FIG. 4A, the first groove 52 receives a first seal 56. The second groove 54 receives a second seal 58. Optionally, each seal may be an O-ring or an engineered seal. FIG. 11 shows a cross sectional view of an embodiment of an engineered seal 5, which may take the place of any of first seals 56 and second seals 58. Engineered seal 5 has a rounded crown portion 2 for engagement with the inner surface 32 of the sleeve 30, a center lobe 4 opposite the crown portion 2 for maintaining compressive load through the seal 5, as well as flanking lobes 6, which may provide stability to engineered seal 5 as it accommodates the motion of the flexible joint 10. Depressions 3 may be located between the center lobe 4 and flanking lobes 6 to accommodate seal deflection and provide relief space for seal expansion.

As shown in FIG. 4A, each groove 52, 54 of the first and second grooves 52, 54 has an inner wall 53 and an outer wall 55. The outer wall 55 of the first groove 52 faces the second end 28 of the ring 20 and the outer wall 55 of the second groove 54 faces the first end 26 of the ring 20. The inner wall 53 of the first groove faces the first end 26 of the ring 20 and the inner wall 53 of the second groove 54 faces the second end 28 of the ring 20. The outer and inner walls 53, 55 may extend transversely to the longitudinal axis 22. Optionally, the outer and inner walls 53, 55 may extend perpendicularly or substantially perpendicularly (for example within 5° of perpendicular) to the longitudinal axis 22. Optionally, the outer and inner walls 53, 55 may each include edge portions at the upper and lower ends of the outer and inner walls 53, 55 that may be chamfered, concave, or convex.

The portion 50 of the outer surface 24 of the ring 20 comprises a partial spherical segment 60. The partial spherical segment 60 has a longitudinal midpoint 61 (i.e., a midpoint of the partial spherical segment 60 along the longitudinal length of the segment 60). A plane 63 contains the midpoint 61 and extends perpendicularly to the longitudinal axis 22. As shown in FIG. 4A, the first groove 52 is positioned on a first side of the longitudinal midpoint 61. The second groove 54 is positioned on a second side of the longitudinal midpoint 61 opposite the first side. The first groove 52 may be axially spaced from plane 63 in a first direction (for example, in a direction towards the first end 26 of the ring 20). The second groove 54 may be axially spaced from the plane 63 in a second direction (for example, in a direction towards the second end 28 of the ring 20). The position of the first and second grooves 52, 54 with respect to the partial spherical segment may allow the sleeve 30 to contact the partial spherical segment 60 between the first and second grooves 52, 54. The partial spherical segment 60 may be positioned between the inner walls 53 of the first and second grooves 52, 54.

As shown in FIG. 3, the partial spherical segment 60 has a center point 62 and a radius $R_S$. The partial spherical segment 60 corresponds to a portion of the outer surface of a sphere having the same radius $R_S$ wherein the segment is formed by cutting the sphere with two parallel or substantially parallel (for example within 5° of parallel) planes. The center point 62 of the partial spherical segment 60 may be the center point of the corresponding sphere. The center point 62 of the partial spherical segment may lie on the longitudinal axis 22 or may lie approximately on the longitudinal axis 22 (for example, a radial distance to the center point 62 from the longitudinal axis 22 may be less than or equal to 5% of the radius $R_S$). In an example, the center point 62 may correspond to the geometric center of the partial spherical segment 60. Along the longitudinal axis 22, the center point 62 may lie centrally between the inner walls 53 of the first and second grooves 52, 54. The radius $R_S$ may be equal to or may be approximately equal to (for example within 5%) the outer radius of the ring 20 at a location including the center point 62 of the partial spherical segment 60 and perpendicular or substantially perpendicular (for example within 5° of perpendicular) to the longitudinal axis 22. As shown in FIG. 3, within a plane 700 containing the longitudinal axis 22 and the center point 62, the partial spherical segment 60 subtends an angle 92, which may be referred to as "third angle" herein, from a first end 74 to a second end 84 of the partial spherical segment 60. The third angle 92 may range from 0.5° to 10°. Optionally, plane 63, which contains the longitudinal midpoint 61 of the partial spherical segment and extends perpendicularly to the longitudinal axis 22, may contain center point 62. When the plane 63 contains the center point 62, the angles of the third angle 62 on either side of plane 63 may be equal or approximately equal (for example within 1° of equal).

As shown in FIG. 4A, the portion 50 of the outer surface 24 of the ring 20 comprises a first frustoconical segment 70 on a first side of the partial spherical segment 60 and a second frustoconical segment 80 on a second side of the partial spherical segment 60, opposite the first side. The first frustoconical segment 70 has an outer surface 76 that tapers away from the partial spherical segment 60 at a first angle 72. The second frustoconical segment 80 has an outer surface 86 that tapers away from the partial spherical segment 60 at a second angle 82. The first and second angles 72, 82 are measured relative to axes 90 parallel to the longitudinal axis 22. The first and second taper angles 72, 82 may range from 0.25° to 5°. The first and second taper angles 72, 82 may be equal. The outer surface 76 of the first frustoconical segment 70 may be tangent to the partial spherical segment 60. The outer surface 86 of the second frustoconical segment 80 may be tangent to the partial spherical segment 60. Optionally, the point of tangency of the outer surface 76 of the first frustoconical segment 70 and the partial spherical segment 60 is at the first end 74 of the partial spherical segment 60. Optionally, the point of tangency of the outer surface 86 of the second frustoconical segment 80 and the partial spherical segment 60 is at the second end 84 of the partial spherical segment 60.

As shown in FIG. 4A, the first groove 52 may be adjacent (optionally, immediately adjacent) to the partial spherical segment 60, and the first groove 52 may be adjacent (optionally, immediately adjacent) to the first frustoconical segment 70. Optionally, the first groove 52 may be positioned between the first end 74 of the partial spherical segment and the first frustoconical segment 70. The second groove 54 may be adjacent (optionally, immediately adjacent) to the partial spherical segment 60, and the second groove 54 may be adjacent (optionally, immediately adjacent) to the second frustoconical segment 80. Optionally, the second groove 54 may be positioned between the second end 84 of the partial spherical segment and the second frustoconical segment 80. Optionally, as shown in FIG. 4A, the inner wall 53 of the first groove 52 may intersect or contact the first end 74 of the partial spherical segment 60. Optionally, as shown in FIG. 4A, the inner wall 53 of the second groove 54 may intersect or contact the second end 84 of the partial spherical segment 60. The inner walls 53 of respective first and second grooves 52, 54 may be contiguous with the partial spherical segment 60. The transition from the partial spherical segment 60 and the inner walls 53 may include the edge portions of the inner walls 53 which may be chamfered, concave, or convex. The outer wall 55 of the first groove 52 may be contiguous with the first frustoconical segment 70. The transition from the first frustoconical segment 70 to the outer wall 55 of the first groove 52 may include the edge portion of the outer wall 55 which may be chamfered, concave, or convex. The outer wall 55 of the second groove 54 may be contiguous with the second frustoconical segment 80. The transition from the second frustoconical segment 80 to the outer wall 55 of the second groove 54 may include the edge portion of the outer wall 55 which may be chamfered, concave, or convex.

Figure 4B:
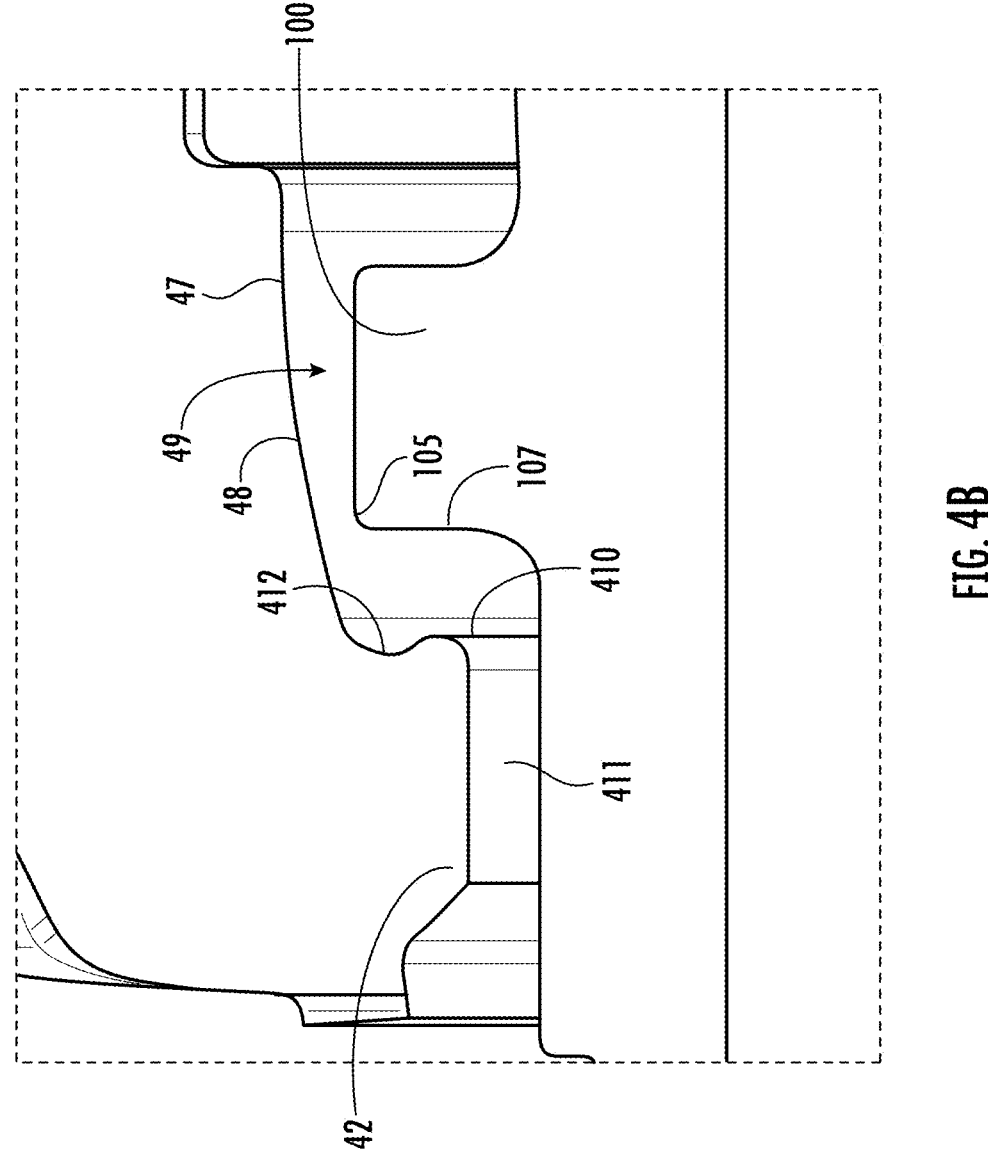
FIG. 4B is a magnified view of area 4B shown in FIG. 3.
Figure 4C:
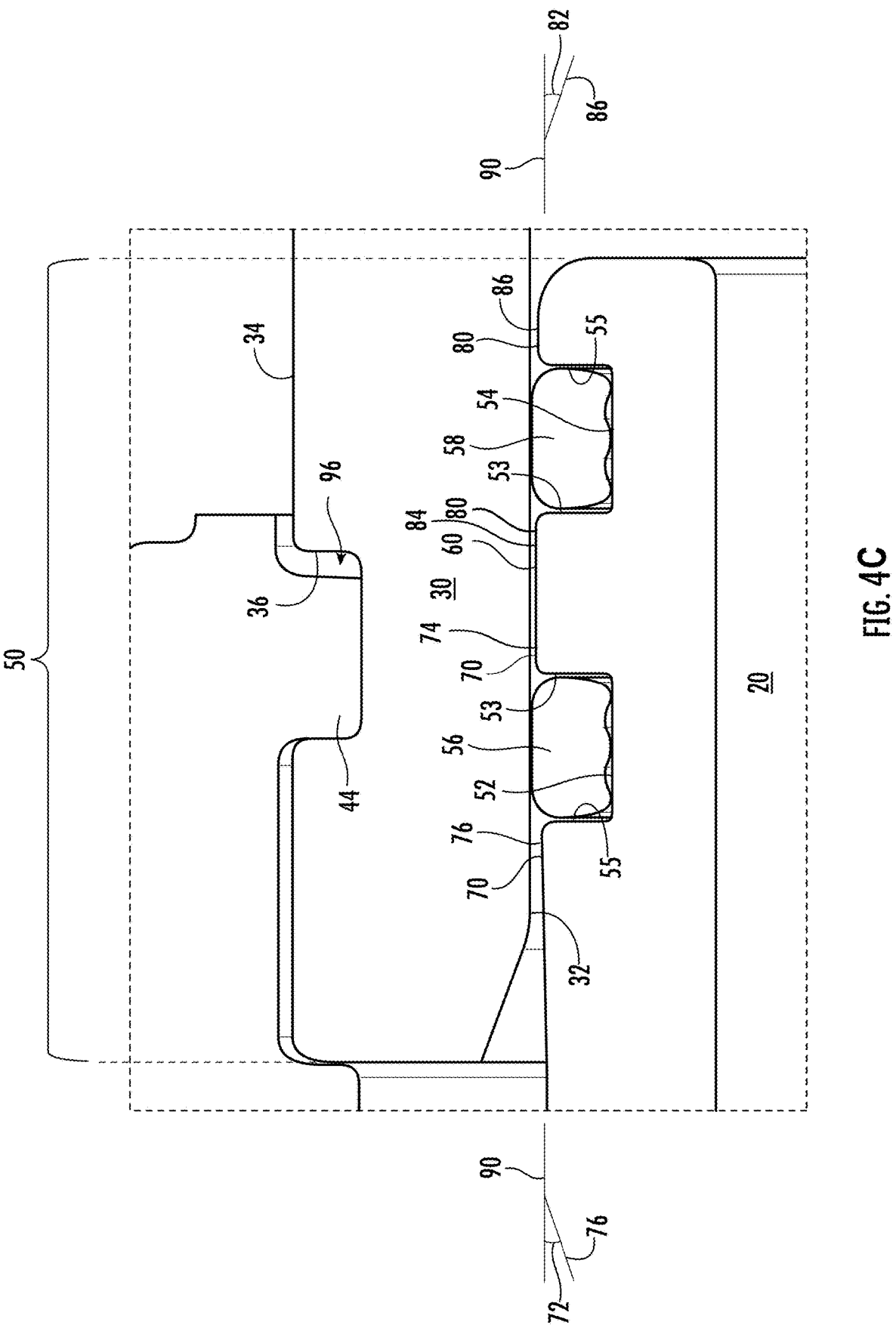
FIG. 4C is shows an alternative embodiment of the features shown in FIG. 4A.

Optionally, as shown in FIG. 4C, the first groove 52 may be positioned within the first frustoconical segment 70. The second groove 54 may be positioned within the second frustoconical segment 80. The inner wall 53 and outer wall 55 of the first groove 52 may each intersect or contact the first frustoconical segment 70. The inner wall 53 and outer wall 55 of the second groove 54 may intersect or contact the second frustoconical segment 80. The inner wall 53 and outer wall 55 of the first groove 52 may be contiguous with the first frustoconical segment 70. The transition from the first frustoconical segment 70 and the inner and/or outer walls 53, 55 may include the edge portions of the respective inner and outer walls 53, 55 which may be chamfered, concave, or convex. The inner wall 53 and outer wall 55 of the second groove 54 may be contiguous with the second frustoconical segment 80. The transition from the second frustoconical segment 80 and the inner and/or outer walls 53, 55 may include the edge portions of the respective inner and outer walls 53, 55 which may be chamfered, concave, or convex. The first frustoconical segment 70 may be immediately adjacent a first end 74 of the partial spherical segment 60 so that the first frustoconical segment 70 intersects or contacts the first end 74 of the partial spherical segment 60. The second frustoconical segment 80 may be immediately adjacent a second end 84 of the partial spherical segment 60 so that the second frustoconical segment 80 intersects or contacts the second end 84 of the partial spherical segment 60. The inner wall 53 of the first groove 52 may be axially spaced from the first end 74 of the partial spherical segment 60 along the longitudinal axis 22, and the inner wall 53 of the second groove 54 may be axially spaced from the second end 84 of the partial spherical segment 60 along the longitudinal axis 22.

Figure 4D:
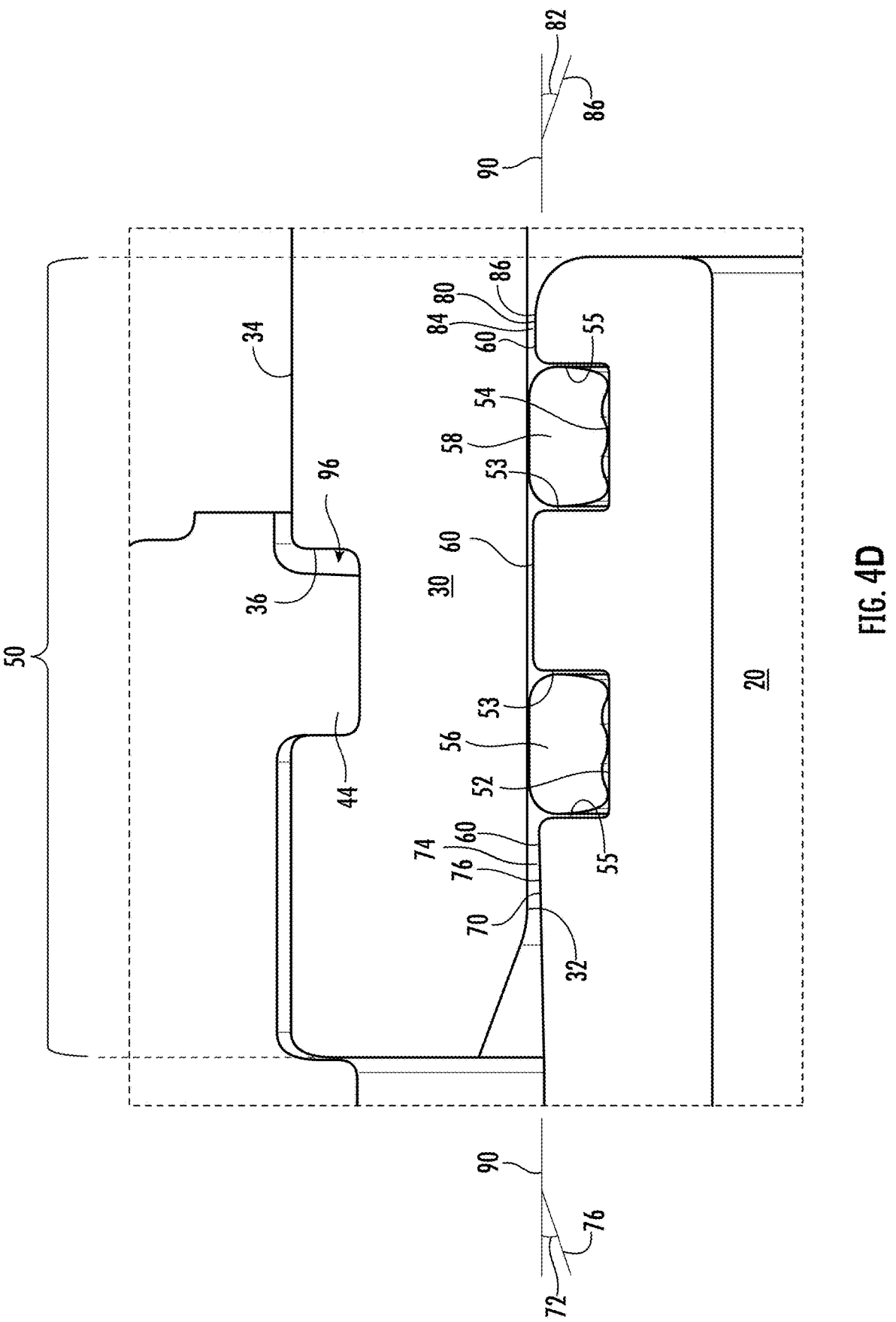
FIG. 4D shows another alternative embodiment of the features shown in FIG. 4A.

Optionally, as shown in FIG. 4D, the first groove 52 may be positioned within the partial spherical segment 60. The second groove 54 may be positioned within the second spherical segment 60. The first groove 52 and the second groove 54 may be positioned between the first end 74 and the second end 84 of the partial spherical segment 60. The inner wall 53 and outer wall 55 of the first groove 52 may each intersect or contact the partial spherical segment 60. The inner wall 53 and outer wall 55 of the second groove 54 may intersect or contact the partial spherical segment 60. The inner wall 53 and outer wall 55 of the first groove 52 may be contiguous with the partial spherical segment 60. The transition from the first partial spherical segment 60 and the inner and/or outer walls 53, 55 may include the edge portions of the respective inner and outer walls 53, 55 which may be chamfered, concave, or convex. The inner wall 53 and outer wall 55 of the second groove 54 may be contiguous with the partial spherical segment 60. The transition from the partial spherical segment 60 and the inner and/or outer walls 53, 55 may include the edge portions of the respective inner and outer walls 53, 55 which may be chamfered, concave, or convex. The first frustoconical segment 70 may be immediately adjacent a first end 74 of the partial spherical segment 60 so that the first frustoconical segment 70 intersects or contacts the first end 74 of the partial spherical segment 60. The second frustoconical segment 80 may be immediately adjacent a second end 84 of the partial spherical segment 60 so that the second frustoconical segment 80 intersects or contacts the second end 84 of the partial spherical segment 60. The inner wall 53 of the first groove 52 may be axially spaced from the first end 74 of the partial spherical segment 60 along the longitudinal axis 22, and the inner wall 53 of the second groove 54 may be axially spaced from the second end 84 of the partial spherical segment 60 along the longitudinal axis 22. It is contemplated that the position of the first groove 52 may be any of the positions described and shown in FIG. 4A, FIG. 4C, or FIG. 4D and the position of the second groove 54 may be any of the positions described and shown in FIG. 4A, FIG. 4C, or FIG. 4D. The positions of the grooves 52, 54 may be combinations of the positions described and shown in FIG. 4A, FIG. 4C, or FIG. 4D. For example:

when the first groove 52 is positioned within the partial spherical segment 60, the second groove 54 may be positioned within the partial spherical segment 60, the second groove 54 may be positioned adjacent the partial spherical segment 60 and adjacent the second frustoconical segment 80, or the second groove 54 may be positioned within the second frustoconical segment 80;

when the first groove 52 is positioned adjacent the partial spherical segment 60 and adjacent the first frustoconical, the second groove 54 may be positioned within the partial spherical segment 60, the second groove 54 may be positioned adjacent the partial spherical segment 60 and adjacent the second frustoconical segment 80, or the second groove 54 may be positioned within the second frustoconical segment 80; or when the first groove 52 is positioned within the first frustoconical segment 70, the second groove 54 may be positioned within the partial spherical segment 60, the second groove 54 may be positioned adjacent the partial spherical segment 60 and adjacent the second frustoconical segment 80, or the second groove 54 may be positioned within the second frustoconical segment 80.

The portion 50 of the outer surface 24 of the ring 20, having a partial spherical segment 60 flanked by the first and second frustoconical segments 70, 80 along with the first and second seals 56, 58, provides clearance for the cylindrical inner surface 32 of the sleeve 30 to roll and slide on to accommodate dynamic movement. The cylindrical inner surface 32 of the sleeve 30 may axially slide along the longitudinal axis 22 of the ring 20 and rotate about the center point 62 of the partial spherical segment 60 to accommodate deflection and axial movement and avoid undesirable tensile stress on a connected pipe. Together, the portion 50 of the outer surface 24 of the ring 20 and the inner surface 32 of the sleeve 30 form a flexible sealed joint.

As shown in FIGS. 1-3, a coupling 40 is configured to attach the sleeve 30 to the ring 20. The coupling 40 is configured to attach the sleeve 30 to the ring 20 while allowing rotation and axial movement of the sleeve 30 relative to the ring 20. The coupling 40 may comprise a plurality of segments 41 coupled end to end. For example, as shown in FIGS. 1 and 2, the coupling 40 may comprise two segments 41 coupled end to end. Each segment 41 may comprise an attachment member 43 extending from each end. The plurality of segments 41 may be coupled end to end via at least one fastener 45 extending through corresponding attachment members 43.

As shown in FIG. 3, the coupling 40 may comprise a first projection 42 extending towards the ring 20 and a second projection 44 extending towards the sleeve 30. The first projection 42 may be moveably engageable with the ring 20. The second projection 44 may be engageable with the sleeve 30. As shown in FIG. 4A, the sleeve 30 may have a recess 36 defined within an outer surface 34 of the sleeve 30 to receive the second projection 44.

As shown in FIG. 3, the coupling 40 may comprise at least one channel 46, 48 positioned between the first projection 42 and the second projection 44. The at least one channel 46, 48 has a surface 47 facing the ring 20 and the sleeve 30. As shown in FIG. 3, the at least one channel 46, 48 may comprise a first and second channel 46, 48. The first channel 46 may be configured to receive a portion of the sleeve 30. The second channel 48, along with the sleeve 130, may define a pocket 49. Pocket 49 may be advantageously hook-shaped in cross section in order to allow for clearance when the sleeve 30 moves relative to the ring 20.

The outer surface 24 of the ring 20 may comprise at least one flange 100 extending circumferentially around the outer surface 24 and extending transversely to the longitudinal axis 22. The flange 100 may be positioned to extend into the pocket 49. The flange 100 may have a height, a width, and a shape that enable the flange 100 to contact the surface 47 of the second channel 48 or the sleeve 30 to limit movement of the sleeve 30 relative to the ring 20. For example, in a neutral or no-offset position (shown in FIGS. 1-5), the flange 100 of the ring 20 may extend into the pocket 49 without contacting the surface 47 of the second channel 48 or the sleeve 30 which define the pocket 49. The flexible joint 10 may be subject to differential settlement, seismic movement or thermal movement. The sleeve 30 may slideably and rotatably move on the portion 50 of the outer surface 24 of the ring 20 to accommodate the differential settlement, seismic movement or thermal movement. As shown in FIG. 5A, the sleeve 30 may move relative the ring 20 until the flange 100 contacts the surface 47 of the second channel 48 or the sleeve 30. The design of the flange 100 and the pocket 49 may be utilized to limit the maximum movement of the sleeve 30 relative to the ring 20 thereby limiting the maximum movement that the seals 56, 58, are required to accommodate.

As shown in FIG. 4B, the first projection 42 of the coupling 40 may include a protrusion 410 adjacent or immediately adjacent an inner surface 411 of the first projection 42 which faces the ring 20. The protrusion 410 may extend towards the flange 100 of the ring 20. The first projection 42 may include a relief 412 adjacent or immediately adjacent the protrusion 410. The protrusion 410 and relief 412 of the first projection 42 may prevent the first projection 42 from contacting and loading the corner 105 of the flange 100 when the flange 100 contacts the surface 47 of the second channel 48 as shown in FIG. 5A. The protrusion 410 and relief 412 may ensure the flange 100 is loaded on its side 107 below the corner 105 upon contact with the surface 47 of the second channel 48 rather than the corner 105 thereby providing a more advantageous load bearing surface.

As seen in FIG. 5A, the configuration of flexible joint assemblies 8, comprising pairs of flexible joints 10 at opposite ends of center spools 12, advantageously allows the flexible joint assemblies to accommodate not only angular deflection AD of pipelines in which they are installed, but also axial offset AO of the ring axes 22 (and thus of the pipeline axes, to which the rings are attached). The length of the center spool 12 along the longitudinal axis 22 may be adjusted to accommodate a desired axial offset AO of the pipelines.

Figure 5:
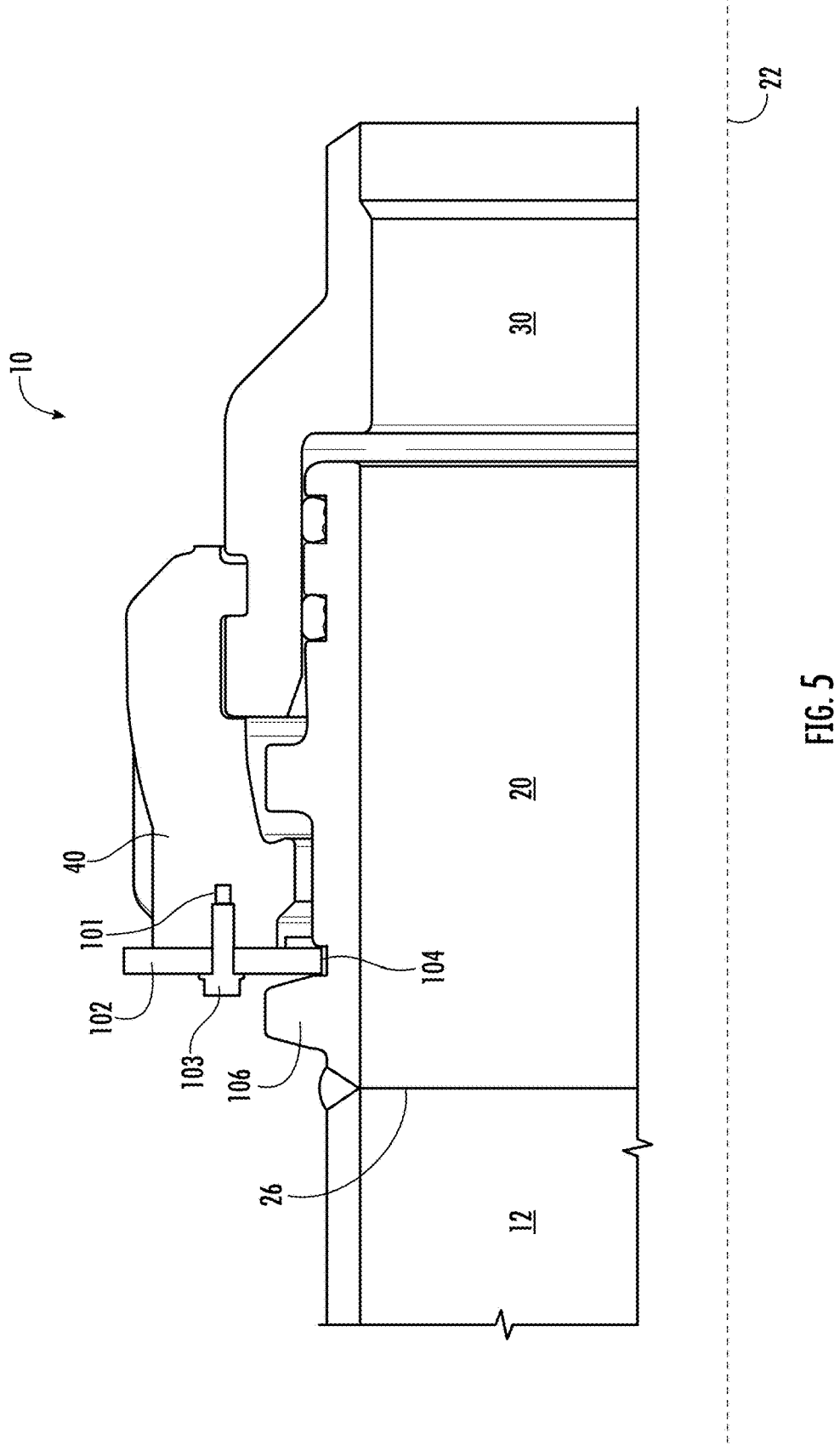
FIG. 5 is another cross sectional view of a portion of the flexible joint assembly of FIG. 2 showing the locking plates.
Figure 5A:
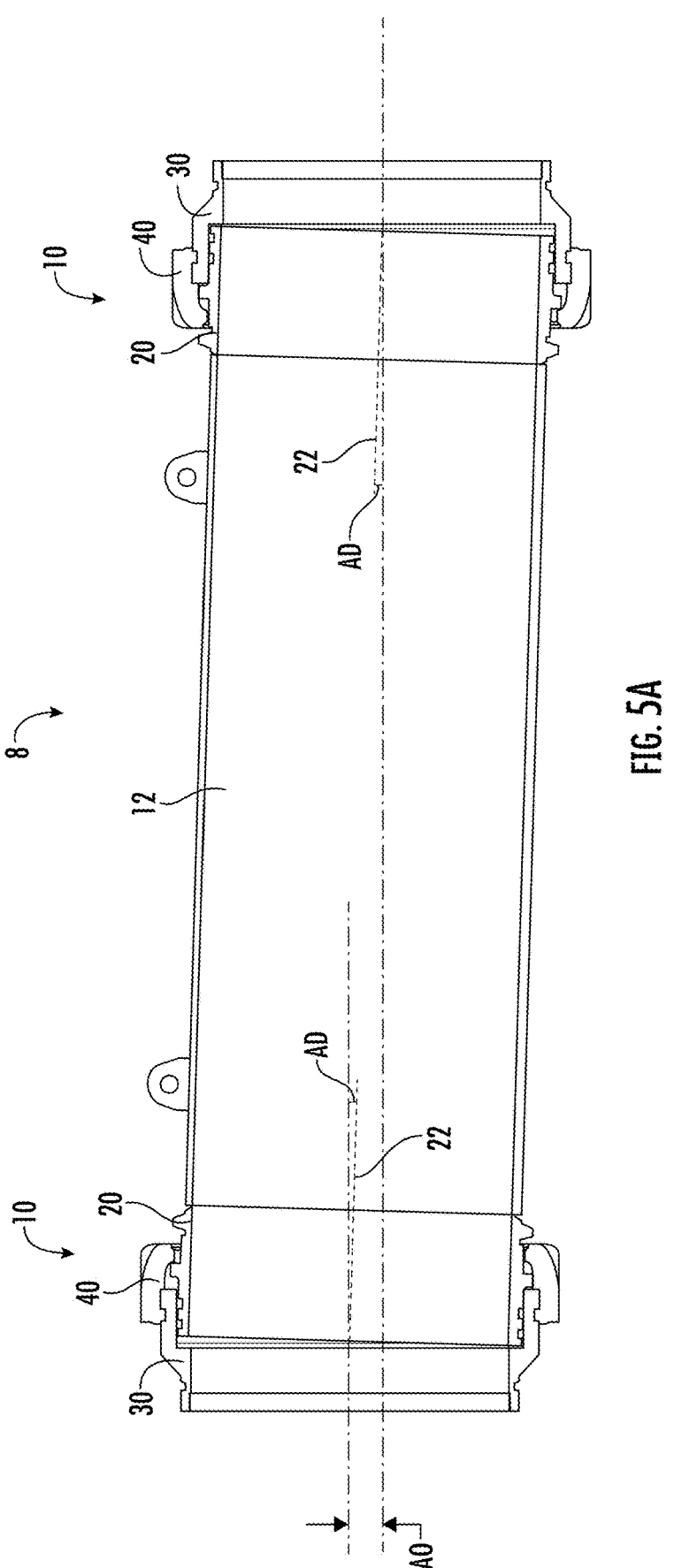
FIG. 5A is a cross sectional view of the example flexible joint assembly shown in FIG. 1.

As shown in FIGS. 1, 2 and 5, the coupling 40 may be adapted to couple with at least one locking device 102. The at least one locking device 102 may comprise a plurality of locking plates spaced circumferentially around the coupling 40. The coupling 40 may comprise a plurality of openings 101. As shown in FIG. 5, each opening 101 may be adapted to receive a fastener 103 to couple a locking device 102, optionally a locking plate, to the coupling 40. The outer surface 24 of the ring 20 may comprise a depression 104 adapted to receive a portion of the locking device 102. Upon receiving the portion of the locking device 102, the sleeve 30 is prevented from moving with respect to the ring 20. It may be advantageous to use removable locking devices 102 to prevent the sleeve 30 from moving with respect to the ring 20 during shipping. Once on site, the locking devices 102 may be removed to allow the sleeve 30 to move with respect to the ring 20.

The outer surface 24 of the ring 20 may comprise a stiffening ring 106 projecting radially outward from the longitudinal axis 22 and extending circumferentially around the outer surface 24. The stiffening ring 106 may be positioned adjacent the depression 104. Optionally, the stiffening ring 106 may have beveled sides. The stiffening ring 106 may provide more rigidity to the ring 20 as well as provide a piloting surface for the locking devices 102.

Figure 6:
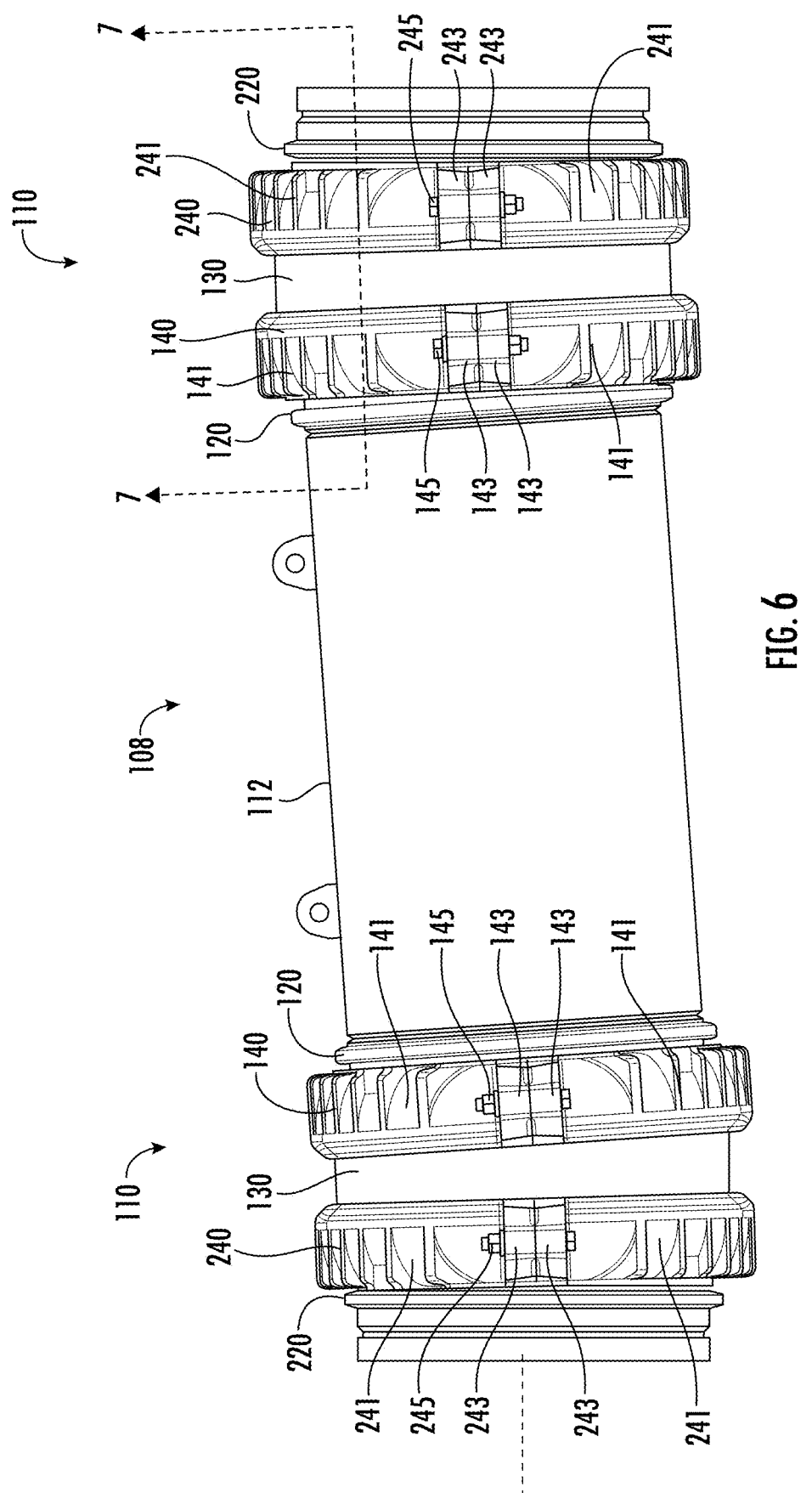
FIG. 6 is a front view of an example flexible joint assembly having an example double expansion joint on either end.

FIG. 6 illustrates example flexible joints 110 coupled to either end of a center spool 112. The flexible joint 110 shown in FIG. 6 is similar to the flexible joint 10 described and shown in FIGS. 1-5A. The flexible joint 110 is a double joint version of the single flexible joint 10 described and shown in FIGS. 1-5A.

Figure 7:
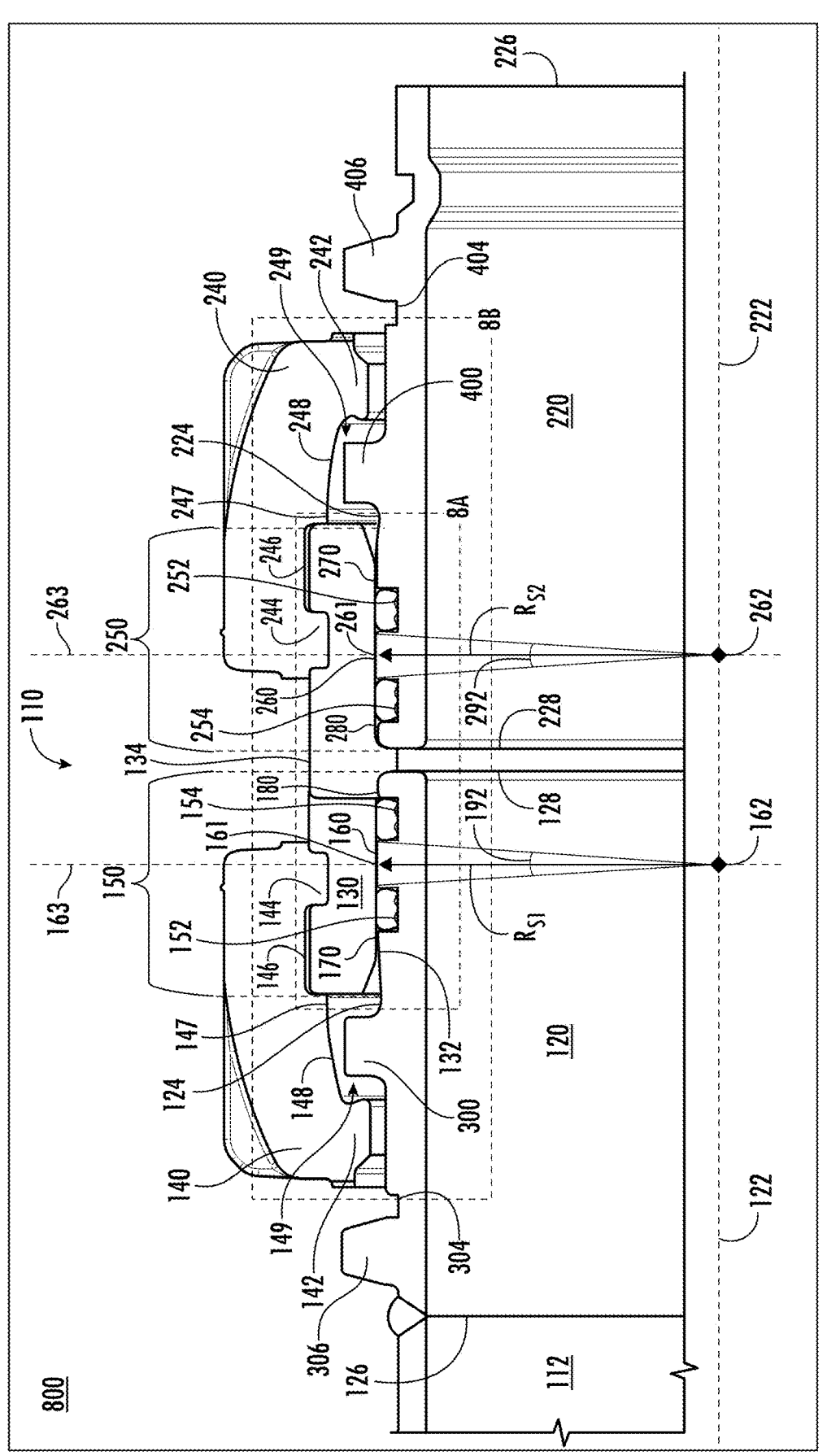
FIG. 7 is a cross sectional view of a portion of the flexible joint assembly of FIG. 6 taken along section line 7-7 in FIG. 6.

As shown in FIGS. 6 and 7, the flexible joint assembly 108 comprises a center spool 112 connected or coupled to flexible joints 110 at either end thereof. Flexible joints 110 comprise a first ring 120 surrounding a first longitudinal axis 122. The first ring 120 has an outer surface 124 and first and second ends 126, 128 oppositely disposed. The first end 126 of the first ring 120 is attachable to an end of the center spool 112. The flexible joint 110 comprises a second ring 220 surrounding a second longitudinal axis 222. The second ring 220 has an outer surface 224 and first and second ends 226, 228 oppositely disposed. The first end 226 of the second ring 220 is sized and configured to be connected or coupled to a pipeline (not shown) to which the flexible joint assembly 108 is to be connected. The first end 226 of sleeve may have a diameter that is substantially the same as the diameter of the pipeline to which the flexible joint assembly 108 is to be connected and may be prepared with any configuration known to those in the art for effecting that connection, commonly, the first end 226 of the second ring 220 may be grooved for a grooved connection (as shown in FIG. 6), prepared with a beveled end for a butt-welded connection, or flanged for a flanged connection.

A sleeve 130 surrounds at least a portion 150 of the outer surface 124 of the first ring 120 and at least a portion 250 of the outer surface 224 of the second ring 220. The portion 150 of the outer surface 124 of the first ring 120 surrounded by the sleeve 130 includes the second end 128 of the first ring 120 and the portion 250 of the outer surface 224 of the second ring 220 surrounded by the sleeve 130 includes the second end 228 of the second ring 220. The sleeve 130 has an inner surface 132 slidably and rotatably engageable with a section of the portion 150 of the outer surface 124 of the first ring 120 and a section of the portion 250 of the outer surface 224 of the second ring 220. The inner surface 132 of the sleeve 130 which is slidably and rotatably engageable with a section of the portion 150 of the outer surface 124 of the first ring 120 and a section of the portion 250 of the outer surface 224 of the second ring 220 is cylindrical.

Figure 8A:
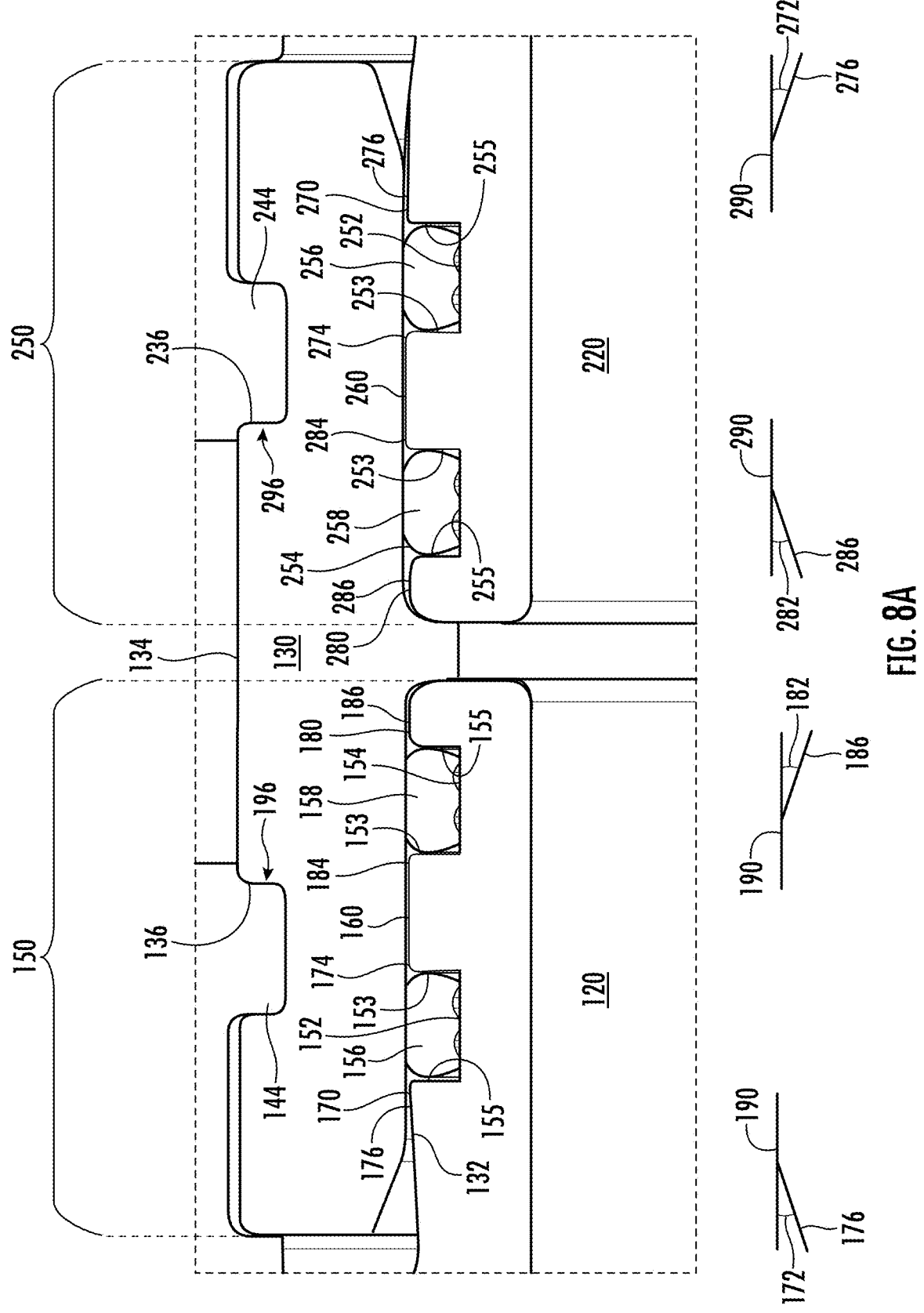
FIG. 8A is a magnified view of area 8A shown in FIG. 7.

The portion 150 of the outer surface 124 of the first ring 120 and the portion 250 of the outer surface 224 of the second ring 220 may each have the same details, features, aspects, and/or configuration as the portion 50 of the outer surface of the ring 22 of the single flexible joint 10 shown in FIGS. 3-5A. The portion 150 of the outer surface 124 of the first ring 120 and the portion 250 of the outer surface 224 of the second ring 220 each comprise a first groove 152, 252 and a second groove 154, 254 spaced axially apart along respective first and second longitudinal axes 122, 222. The first grooves 152, 252 receive a first seal 156, 256 and the second grooves 154, 254 receive a second seal 158, 258. Optionally, each seal may be an O-ring, or may take the form of engineered seal 5 or other shapes found to be advantageous. As shown in FIG. 8A, each groove of the first and second grooves 152, 154, 252, 254 has an inner wall 153, 253 and an outer wall 155, 255. The outer walls 155, 255 of the first grooves 152, 252 face the second ends 128, 228 of respective first and second rings 120, 220. The outer walls 155, 255 of the second grooves 154, 254 face the first ends 126, 226 of respective first and second rings 120, 220. The inner walls 153, 253 of the first grooves 152, 252 face the first ends 126, 226 of respective first and seconds rings 120, 220. The inner walls 153, 253 of the second grooves 154, 254 face the second ends 128, 228 of respective first and second rings 120, 220. The outer and inner walls 153, 253, 155, 255 may extend transversely to respective first and second longitudinal axes 122, 222. Optionally, the outer and inner walls 153, 155, 253, 255 may extend perpendicularly or substantially perpendicularly (for example, within 5° of perpendicular) to respective first and second longitudinal axes 122, 222. Optionally, the outer and inner walls 153, 155, 253, 255 may each include edge portions at the upper and lower ends of the outer and inner walls 153, 155, 253, 255 the may be chamfered, concave, or convex.

The portion 150 of the outer surface 124 of the first ring 120 and the portion 250 of the outer surface 224 of the second ring 220 each comprise a partial spherical segment 160, 260. Each partial spherical segment 160, 260 has a respective longitudinal midpoint 161, 163. A first plane 163 contains midpoint 161 and extends perpendicularly to the first longitudinal axis 122. A second plane 263 contains midpoint 261 and extends perpendicularly to the second longitudinal axis 222. First grooves 152, 252 are positioned on first sides of respective longitudinal midpoints 161, 261. Second grooves 154, 254 are positioned on second sides of respective longitudinal midpoints 161, 261 opposite the first sides. The first grooves 152, 252 may be axially spaced from respective planes 163, 263 in a first direction (for example, in a direction towards the respective first ends 126, 226 of the rings 120, 220). The second grooves 154, 254 may be axially spaced from the respective planes 163, 263 in a second direction (for example, in a direction towards the respective second ends 128, 228 of the rings 120, 220). The position of the first and second grooves 152, 154, 252, 254 with respect to the respective partial spherical segments 160, 260 may allow the sleeve 130 to contact the partial spherical segments 160, 260 between the respective first and second grooves 152, 154, 252, 254. The partial spherical segments 160, 260 may be positioned between the respective inner walls 153, 253 of the first and second grooves 152, 154, 252, 254.

As shown in FIG. 7, the partial spherical segment 160 of the first ring 120 has a center point 162 (e.g., a geometric center point) and a radius $R_{S1}$. The partial spherical segment 160 corresponds to a portion of the outer surface of a sphere having the same radius $R_{S1}$ wherein the segment is formed by cutting the sphere with two parallel or substantially parallel (for example within 5° of parallel) planes. The center point 162 of the partial spherical segment 160 may be the center point of the corresponding sphere. The center point 162 may lie on the first longitudinal axis 122 or may lie approximately on the first longitudinal axis 122 (for example, a radial distance to the center point 162 from the longitudinal axis 122 may be within 5% of the radius $R_{S1}$). The partial spherical segment 260 of the second ring 220 has a center point 262 (e.g., a geometric center point) and a radius $R_{S2}$. The partial spherical segment 260 corresponds to a portion of the outer surface of a sphere having the same radius $R_{S2}$ wherein the segment is formed by cutting the sphere with two parallel or substantially parallel (for example within 5° of parallel) planes. The center point 262 may lie on the second longitudinal axis 222 or may lie approximately on the second longitudinal axis 222 (for example, a radial distance to the center point 262 from the longitudinal axis 222 may be within 5% of the radius $R_{S2}$). The center points 162, 262 may lie centrally between respective inner walls 153, 253 of the first and second grooves 152, 252. The radius $R_{S1}$ of the partial spherical segment 160 of the first ring 120 may be equal to or may be approximately equal to (for example within 5%) the outer radius of the first ring 120 at a location including the center point 162 of the partial spherical segment 160 of the first ring 120 and perpendicular or substantially perpendicularly (for example within 5° of perpendicular) to the first longitudinal axis 122. The radius $R_{S2}$ of the partial spherical segment 260 of the second ring 220 may be equal to or may be approximately equal to (for example within 5%) the outer radius of the second ring 220 at a location including the center point 262 of the partial spherical segment 260 of the second ring 220 and perpendicular or substantially perpendicularly (for example within 5° of perpendicular) to the second longitudinal axis 222. As shown in FIG. 7, within a plane 800 that contains the first and second longitudinal axes 122, 222 and the center points 162, 262, each partial spherical segment 160, 260 subtends a respective angle 192, 292, which may be referred to as "third angle" herein, from a first end 174, 274 to a second end 184, 284 of the respective partial spherical segment 160, 260. The third angles 192, 292 may range from 0.5° to 10°. Optionally, planes 163 and 263 may contain the respective center points 162, 262. When the planes 163, 263 contain the center points 162, 262, the angles of the third angle 162, 262 on either side of the respective plane 163, 263 may be equal or approximately equal (for example within 1° of equal).

As shown in FIG. 8A, the portion 150 of the outer surface 124 of the first ring 120 and the portion 250 of the outer surface 224 of the second ring 220 each comprise a first frustoconical segment 170, 270 adjacent respective partial spherical segments 160, 260 and a second frustoconical segment 180, 280 adjacent respective partial spherical segments 160, 260. The first frustoconical segments 170, 270 have outer surfaces 176, 276 that taper away from respective partial spherical segments 160, 260 at first angles 172, 272. The second frustoconical segments 180, 280 have outer surface 186, 286 that taper away from respective partial spherical segments 160, 260 at second angles 182, 282. The first and second angles 172, 182 of the first and second frustoconical segments 170, 180 of the outer surface 124 of the first ring 120 are measured relative to axes 190 parallel to the first longitudinal axis 122. The first and second angles 272, 282 of the first and second frustoconical segments 270, 280 of the outer surface 224 of the second ring 220 are measured relative to axes 290 parallel to the second longitudinal axis 222. The first and second taper angles 172, 182, 272, 282 may range from 0.25° to 5°. The first and second taper angles 172, 182, 272, 282 may be equal. The outer surfaces 176, 276 of the first frustoconical segments 170, 270 may be tangent to respective partial spherical segments 160, 260. The outer surfaces 186, 286 of the second frustoconical segments 180, 280 may be tangent to respective partial spherical segments 160, 260. Optionally, the point of tangency of the outer surfaces 176, 276 of the first frustoconical segments 170, 270 and respective partial spherical segments 160, 260 is at the respective first ends 174, 274 of the partial spherical segments 160, 260. Optionally, the point of tangency of the outer surfaces 186, 286 of the second frustoconical segments 180, 280 and respective partial spherical segments 160, 260 is at the respective second ends 184, 284 of the partial spherical segments 160, 260.

The configuration of each portion 150, 250 of the rings 120, 220 including the position of the grooves 152, 154, 252, 254 with respect to respective partial spherical segments 160, 260 and first and second frustoconical segments 170, 180, 270, 280, may be the same or substantially the same as the example configurations of the portion 50 of the ring 20 in the single flexible assembly 10 described herein and shown in FIGS. 4A, 4C, and 4D.

The portion 150 of the outer surface 124 of the first ring 120 and the portion 250 of the outer surface 224 of the second ring 220, each including a partial spherical segment 160, 260 flanked by first and second frustoconical segments 170, 180, 270, 280 along with first and second seals 156, 256, 158, 258, provide clearance for the cylindrical inner surface 132 of the sleeve 130 to roll and slide on to accommodate dynamic movement. The cylindrical inner surface 132 of the sleeve 130 may axially slide along the longitudinal axes 122, 222 of the rings 120, 220 and rotate about the center points 162, 262 of the partial spherical segments 160, 260 to accommodate deflection and axial movement and avoid undesirable tensile stress on connected pipes. Together, the portion 150 of the outer surface 124 of the first ring 120, the portion 250 of the outer surface 224 of the second ring 220, and the inner surface 132 of the sleeve 130 form a flexible sealed joint.

As shown in FIGS. 6 and 7, a first coupling 140 is configured to attach the sleeve 130 to the first ring 120. A second coupling 240 is configured to attach the sleeve 130 to the second ring 220. The couplings 140, 240 are configured to attach the sleeve 130 to the rings 120, 220 while allowing rotation and axial movement of the sleeve 130 with respect to the rings 120, 220. Each coupling of the first and second couplings 140, 240 may comprise a plurality of segments 141, 241 coupled end to end. For example, as shown in FIG. 6, each coupling 140, 240 may comprise two segments 141, 241 coupled end to end. Each segment of the plurality of segments 141, 241 comprises an attachment member 143, 243 extending from each end. The plurality of segments 141, 241 of respective first and second couplings 140, 240 are coupled end to end via at least one fastener 145, 245 extending through corresponding attachment members 143, 243.

As shown in FIG. 7, the first coupling 140 may comprise a first projection 142 extending towards the first ring 120 and a second projection 144 extending towards the sleeve 130. The second coupling 240 may comprise a first projection 242 extending towards the second ring 220 and a second projection 244 extending towards the sleeve 130. The first projection 142 of the first coupling 140 may be moveably engageable with the first ring 120. The first projection 242 of the second coupling 240 may be moveably engageable with the second ring 220. The second projections 144, 244 of the first and second couplings 140, 240 may be engageable with the sleeve 130. The sleeve 130 may have a first recess 136 and a second recess 236 defined within an outer surface 134 to receive the second projection 144 of the first coupling 140 and the second projection 244 of the second coupling 240, respectively.

As shown in FIG. 7, each of the first and second couplings 140, 240 may comprise at least one channel 146, 148, 246, 248 positioned between the first projection 142, 242 and the second projection 144, 244. The at least one channel 146, 148 of the first coupling 140 has a surface 147 facing the first ring 120 and the sleeve 130. The at least one channel 246, 248 of the second coupling 240 has a surface 247 facing toward the second ring 220 and the sleeve 130. As shown in FIG. 7, the at least one channel 146, 148 of the first coupling 140 may comprise first and second channels 146, 148. The first channel 146 is configured to receive a first portion of the sleeve 130. The second channel 148, along with the sleeve 130, defines a pocket 149. The at least one channel 246, 248 of the second coupling 240 may comprise first and second channels 246, 248. The first channel 246 is configured to receive a second portion of the sleeve 130. The second channel 248, along with the sleeve 130, defines a pocket 249. The pockets 149, 249 are advantageously hook-shaped in cross section in order to allow for clearance when the sleeve 130 moves relative to the rings 120, 220.

The outer surface 124 of the first ring 120 may comprise at least one flange 300 extending circumferentially around the outer surface 124 of the first ring 120 and extending transversely to the first longitudinal axis 122. The outer surface 224 of the second ring 220 may comprise at least one flange 400 extending circumferentially around the outer surface 224 of the second ring 220 and extending transversely to the second longitudinal axis 222. The flanges 300, 400 are positioned to extend into respective pockets 149, 249. The flange 300 of the first ring 120 has a height, a width, and a shape that enable the flange 300 of the first ring 120 to contact the surface 147 of the second channel 148 of the first coupling 140 or the sleeve 130 to limit movement of the sleeve 130 relative to the first ring 120. The flange 400 of the second ring 220 has a height, a width, and a shape that enable the flange 400 of the second ring 220 to contact the surface 247 of the second channel 248 of the second coupling 240 or the sleeve 130 to limit movement of the sleeve 130 relative to the second ring 220. For example, in a neutral or no-offset position (shown in FIGS. 7 and 9), the flange 300 of the first ring 120 may extend into the pocket 149 without contacting the surface 147 of the second channel 148 of the first coupling 140 or the sleeve 130 which define the pocket 149. In a neutral or no-offset position, the flange 400 of the second ring 220 may extend into the pocket 249 without contacting the surface 247 of the second channel 248 of the second coupling 240 or the sleeve 130 which define the pocket 249. The flexible joint 110 may be subject to differential settlement, seismic movement or thermal movement. The sleeve 130 may slideably and rotatably move on the portion 150 of the outer surface 124 of the first ring 120 and the portion 250 of the outer surface 224 of the second ring 220 to accommodate the differential settlement, seismic movement or thermal movement. As shown in FIG. 10, the sleeve 130 may move relative the first ring 120 until the flange 300 of the first ring 120 contacts the surface 147 of the second channel 148 of the first coupling 140 or the sleeve 130. As shown in FIG. 10, the sleeve 130 may move relative to the second ring 220 until the flange 400 of the second ring 220 contacts the surface 247 of the second channel 248 of the second coupling 240 or the sleeve 130.

The design of the flanges 300, 400 and the pockets 149, 249 may be utilized to limit the maximum movement of the sleeve 130 relative to the first ring 120 and the second ring 220 thereby limiting the design challenges for the seals 156, 158, 256, 258. As the sleeve 130 moves relative to the first and second rings 120, 220, the amount the first seals 156, 256 and second seals 158, 258 are compressed varies circumferentially and axially. For example, with reference to the assembly 108 shown in FIG. 10, when the joint 110 is in an offset position or not in a neutral position according to FIG. 10, the first seal 156 of the first ring 120 may be more compressed at the top of the first ring 120 and less compressed at the bottom of the first ring 120 while the second seal 158 of the first ring 120 is more compressed at the top of the first ring 120 and less compressed at the bottom of the first ring 120. Still further, the first seal 156 may be more compressed at the outer wall 155 of the groove 152 and less compressed at the inner wall 153 of the groove 152 at the top of the first ring 120 and less compressed at the outer wall 155 of the groove 152 and more compressed at the inner wall 153 of the groove 152 at the bottom of the first ring 120 while the second seal 158 may be less compressed at the outer wall 155 of the groove 154 and more compressed at the inner wall 153 of the groove 154 at the top of the first ring 120 and more compressed at the outer wall 155 of the groove 154 and less compressed at the inner wall 153 of the groove 154 at the bottom of the first ring 120. Because too much decompression of a seal 156, 158, 256, 258 may result in a leak path, limiting the amount of angular movement of the rings 120, 220 relative to the sleeve 130 through the design of the pockets 149, 249 and flanges 300, 400, limits the amount the seals 156, 158, 256, 258 decompress and thereby prevents leaks.

Figure 8B:
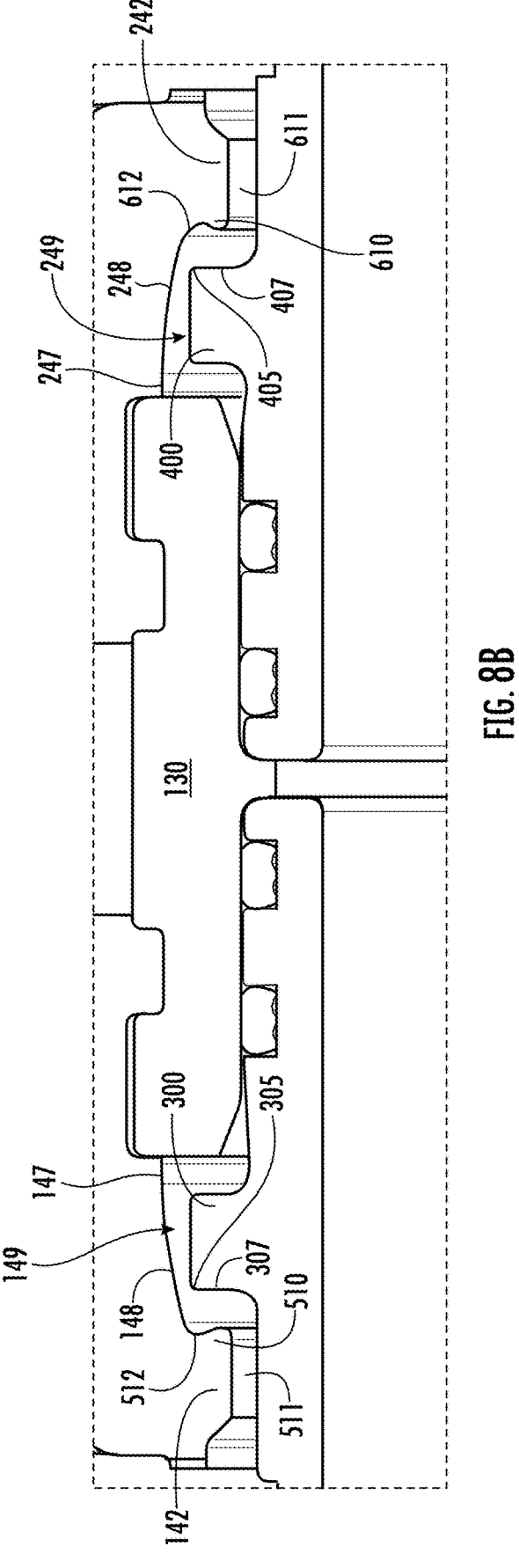
FIG. 8B is a magnified view of area 8B shown in FIG. 7.

As shown in FIG. 8B, the first projection 142 of the first coupling 140 may include a protrusion 510 adjacent or immediately adjacent the first projection's 142 inner surface 511 facing the first ring 120. The protrusion 510 extends towards the flange 300 of the first ring 120. The first projection 142 of the first coupling 140 may include a relief 512 adjacent or immediately adjacent the protrusion 510. The first projection 242 of the second coupling 240 may include a protrusion 610 adjacent or immediately adjacent the first projection's 242 inner surface 611 facing the second ring 220. The protrusion 610 extends towards the flange 400 of the second ring 220. The first projection 242 of the second coupling 240 may include a relief 612 adjacent or immediately adjacent the protrusion 610. The protrusions 510, 610 and reliefs 512, 612 may prevent the first projections 142, 242 from contacting and loading the corner 305, 405 of the respective flange 300, 400 when the flange 300, 400 contacts the surface 147, 247 of the second channel 148, 248 as shown in FIG. 10. The protrusions 510, 610 and reliefs 512, 612 may ensure the flanges 300, 400 are loaded on the sides 307, 407 below the corners 305, 405 upon contact with the surfaces 147, 247 of the second channels 148, 248.

As seen in FIG. 10, the configuration of flexible joint assemblies 108, comprising pairs of flexible joints 110 at opposite ends of center spool 112, advantageously allows the flexible joint assemblies to accommodate not only angular deflection AD of pipelines in which they are installed, but also axial offset AO of the ring axes 122, 222 (and thus of the pipeline axes, to which the rings are attached). As each flexible joint 110 itself comprises two portions 150 and 250 in which deflection can be accommodated, flexible joint assembly 108 can provide for the accommodation of greater total angular movement and lateral offset than can flexible joint assembly 8.

Figure 9:
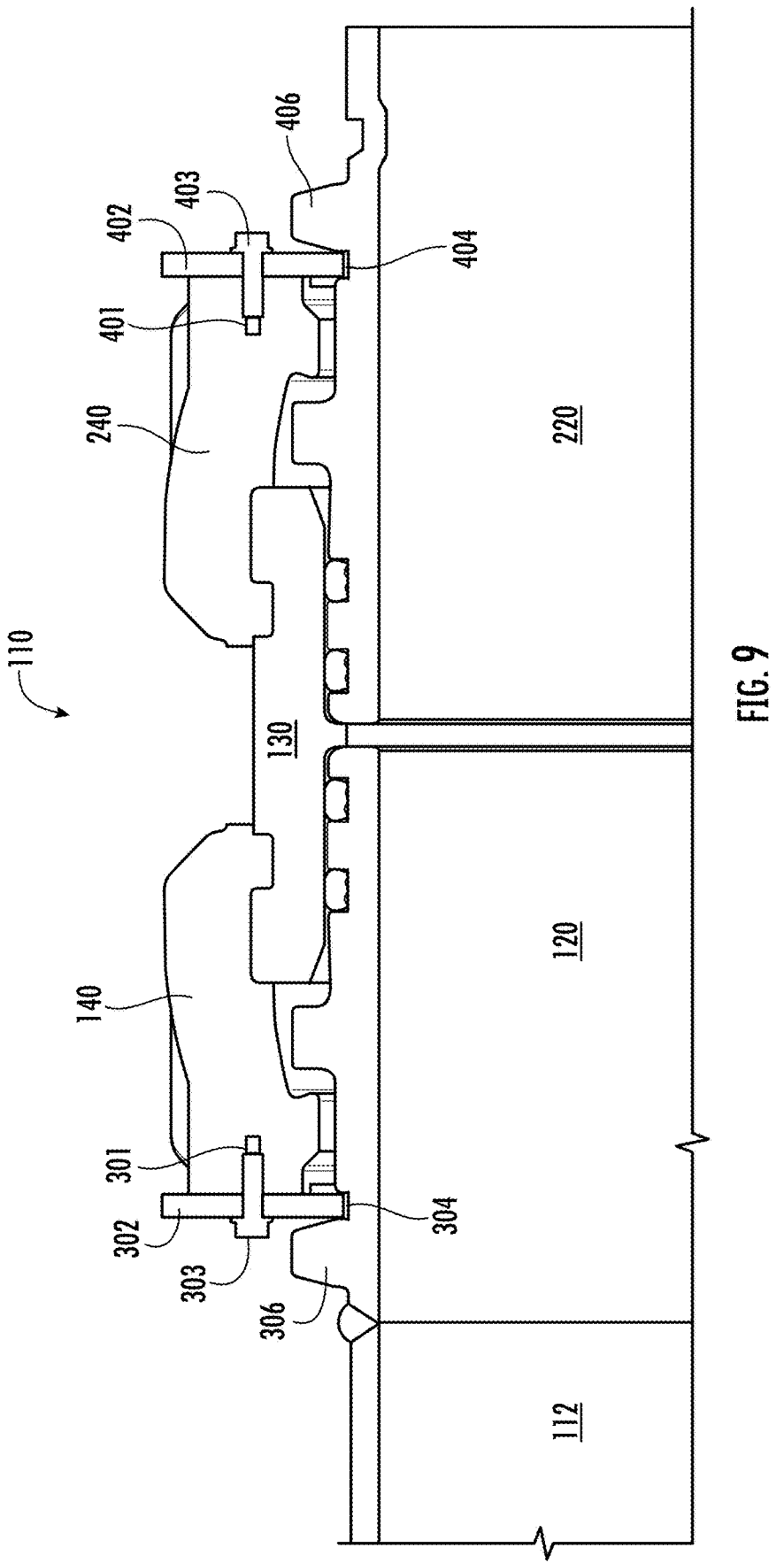
FIG. 9 is another cross sectional view of a portion of the flexible joint assembly of FIG. 6 showing the locking plates.
Figure 10:
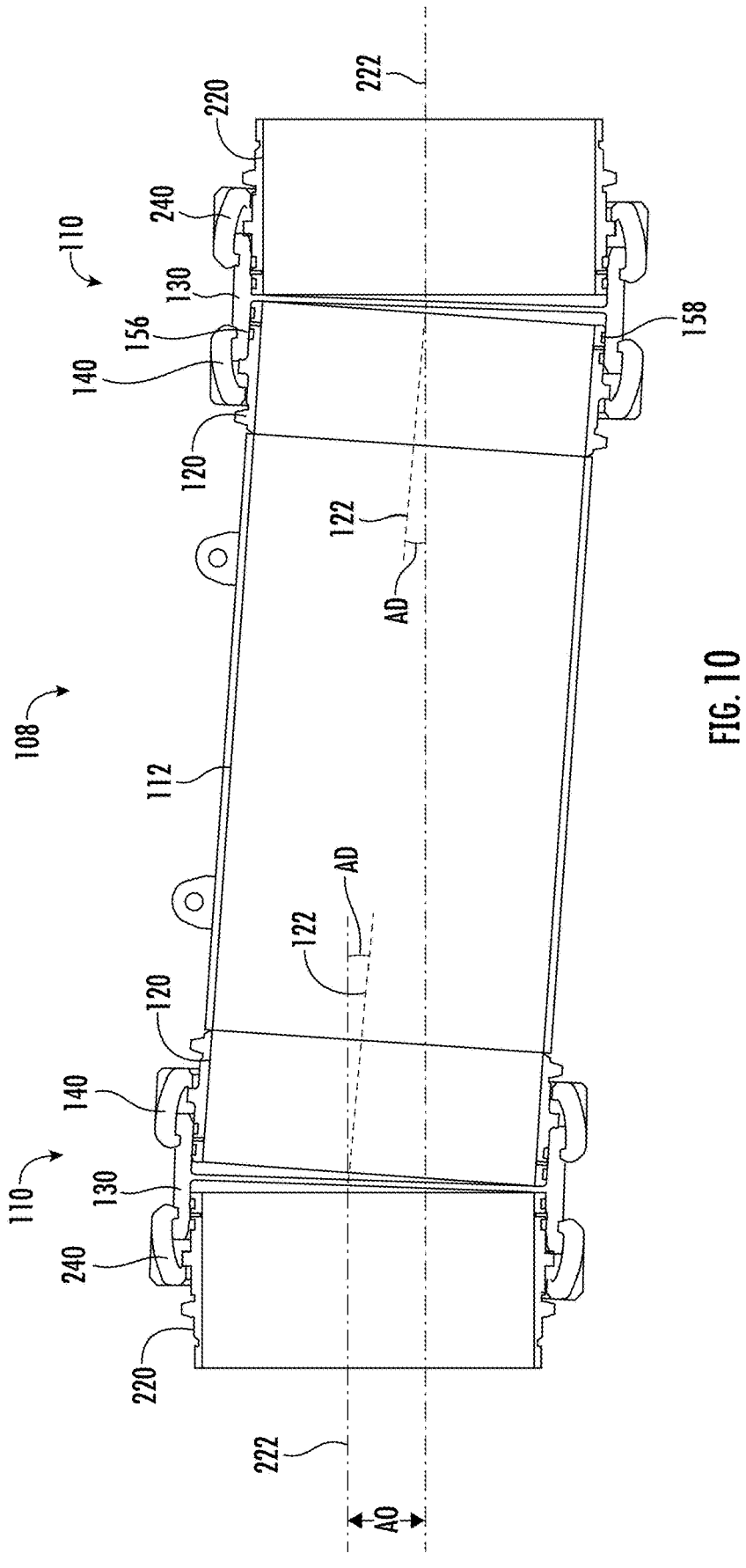
FIG. 10 is a cross sectional view of the example flexible joint assembly shown in FIG. 6.

As shown in FIG. 9, the first coupling 140 may be adapted to couple with at least one first locking device 302. The second coupling 240 may be adapted to couple with at least one second locking device 402. The at least one first locking device 302 may comprise a plurality of first locking plates spaced circumferentially around the first coupling 140. The at least one second locking device 402 may comprise a plurality of second locking plates spaced circumferentially around the second coupling 240. The first coupling 140 may comprise a plurality of first openings 301. Each first opening of the plurality of first openings may be adapted to receive a fastener 303 to couple a locking device of the at least one first locking device 302 to the first coupling 140. The second coupling 240 may comprise a plurality of second openings 401. Each second opening of the plurality of second openings 401 may be adapted to receive a fastener 403 to couple a locking device of the at least one second locking device 402 to the second coupling 240. The outer surface 124 of the first ring 120 may comprise a depression 304 adapted to receive a portion of the first locking device 302. The outer surface 224 of the second ring 220 may comprise a depression 404 adapted to receive a portion of the second locking device 402. Upon receiving the portion of the first locking device 302 and the second locking device 402, the sleeve 130 is prevented from moving with respect to the first and second rings 120, 220. It may be advantageous to use removable locking devices 302, 402 to prevent the sleeve 130 from moving with respect to the first and second rings 120, 220 during shipping. Once on site, the locking devices 302, 402 may be removed to allow the sleeve 130 to move with respect to the first and second rings 120, 220.

The outer surface 124 of the first ring 120 may comprise a stiffening ring 306 projecting outwardly away from the first longitudinal axis 122 and extending circumferentially around the outer surface 124 of the first ring 120. The outer surface 224 of the second ring 220 may comprise a stiffening ring 406 projecting outwardly away from the second longitudinal axis 222 and extending circumferentially around the outer surface 224 of the second ring 220. The stiffening rings 306, 406 may be positioned adjacent to respective depressions 304, 404. Optionally, the stiffening rings 306, 406 have beveled sides. The stiffening rings 306, 406 may provide rigidity to the rings 120, 220 and provide a piloting surface for the locking devices 302, 402.

It is expected that the flexible joints according to the disclosure will accommodate dynamic movement, such as differential settlement, seismic movement, and thermal movement, of pipe line sections thereby preventing damage while also eliminating various design disadvantages associated with conventional flexible joints.

Example Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A flexible joint, the flexible joint comprising:
a ring surrounding a longitudinal axis and having an outer surface and first and second ends oppositely disposed, the first end of the ring attachable to an end of a center spool;
a sleeve surrounding at least a portion of the outer surface of the ring and having an inner surface slidably engageable with a section of the portion of the outer surface of the ring, the portion of the outer surface including the second end of the ring; and
a coupling configured to attach the sleeve to the ring; wherein
the portion of the outer surface comprises:
a partial spherical segment having a longitudinal midpoint,
a first frustoconical segment positioned adjacent a first end of the partial spherical segment, an outer surface of the first frustoconical segment tapering away from the partial spherical segment at a first angle,
a second frustoconical segment positioned adjacent a second end of the partial spherical segment, an outer surface of the second frustoconical segment tapering away from the partial spherical segment at a second angle, and
a first groove and a second groove spaced axially apart along the longitudinal axis, the first groove positioned on a first side of the longitudinal midpoint of the partial spherical segment, the second groove positioned on a second side of the longitudinal midpoint of the partial spherical segment opposite the first side, the first groove receiving a first seal and the second groove receiving a second seal, each groove of the first and second grooves having an inner wall and an outer wall.

Aspect 2: The flexible joint according to aspect 1, wherein:
the first groove is positioned adjacent the partial spherical segment,
the first groove is positioned adjacent the first frustoconical segment,
the second groove is positioned adjacent the partial spherical segment, and
the second groove is positioned adjacent the second frustoconical segment.

Aspect 3: The flexible joint according to aspect 1, wherein the first groove and the second groove are positioned within the partial spherical segment.

Aspect 4: The flexible joint according to aspect 1, wherein the first groove is positioned within the first frustoconical segment, and the second groove is positioned within the second frustoconical segment.

Aspect 5: The flexible joint according to any of the preceding aspects, wherein the partial spherical segment has a center point that lies on the longitudinal axis.

Aspect 6: The flexible joint according to any of the preceding aspects, wherein the first and second angles are measured relative to axes parallel to the longitudinal axis.

Aspect 7: The flexible joint according to any of the preceding aspects, wherein the coupling comprises a first projection extending towards the outer surface of the ring and a second projection extending towards the sleeve, the first projection engageable with the ring and the second projection engageable with the sleeve.

Aspect 8: The flexible joint according to aspect 7, wherein the sleeve has an outer surface and a recess defined within the outer surface to receive the second projection.

Aspect 9: The flexible joint according to aspect 7 or aspect 8, wherein the coupling further comprises at least one channel positioned between the first projection and the second projection, the at least one channel having a surface facing toward the ring and the sleeve.

Aspect 10: The flexible joint according to aspect 9, wherein the at least one channel comprises a first channel configured to receive a portion of the sleeve and a second channel defining a pocket.

Aspect 11. The flexible joint according to aspect 10, wherein the outer surface of the ring further comprises at least one flange extending circumferentially around the outer surface and extending transversely to the longitudinal axis.

Aspect 12. The flexible joint according to aspect 11, wherein the flange is positioned to extend into the pocket of the coupling.

Aspect 13: The flexible joint according to aspect 12, wherein the flange has a height, a width, and a shape that enable the flange to contact the surface of the second channel to limit movement of the sleeve relative to the ring.

Aspect 14: The flexible joint according to any of the preceding aspects, wherein the coupling is adapted to couple with at least one locking device.

Aspect 15: The flexible joint according to aspect 14, wherein the coupling comprises a plurality of openings 101, wherein each opening of the plurality of openings is adapted to receive a fastener to couple a locking device of the at least on locking device to the coupling.

Aspect 16. The flexible joint according to aspect 14 or aspect 15, wherein the outer surface of the ring further comprises a depression adapted to receive a portion of the locking device, wherein upon receiving the portion of the locking device, the sleeve is prevented from moving with respect to the ring.

Aspect 17: The flexible joint according to aspect 16, wherein the outer surface of the ring further comprises a stiffening ring projecting outwardly away from the longitudinal axis and extending circumferentially around the outer surface, wherein the stiffening ring is positioned adjacent the depression.

Aspect 18: The flexible joint according to any of the preceding aspects, wherein the coupling comprises a plurality of segments coupled end to end.

Aspect 19: The flexible joint according to aspect 18, wherein each segment of the plurality of segments comprises an attachment member extending from each end, wherein the plurality of segments are coupled end to end via at least one fastener extending through corresponding attachment members.

Aspect 20: The flexible joint according to any of the preceding aspects, wherein the partial spherical segment subtends a third angle.

Aspect 21: A flexible joint, the flexible joint comprising:

a first ring surrounding a first longitudinal axis and having an outer surface and first and second ends oppositely disposed, the first end of the first ring attachable to an end of a center spool;

a second ring surrounding a second longitudinal axis and having an outer surface and first and second ends oppositely disposed;

a sleeve surrounding at least a portion of the outer surface of the first ring and at least a portion of the outer surface of the second ring, the sleeve having an inner surface slidably engageable with a section of the portion of the outer surface of the first ring and a section of the portion of the outer surface of the second ring, the portion of the outer surface of the first ring including the second end of the first ring and the portion of the outer surface of the second ring including the second end of the second ring;

a first coupling configured to attach the sleeve to the first ring; and a second coupling configured to attach the sleeve to the second ring; wherein the portion of the outer surface of the first ring and the portion of the outer surface of the second ring each comprise:

a partial spherical segment having a longitudinal midpoint, a first frustoconical segment positioned adjacent a first end of the partial spherical segment, an outer surface of the first frustoconical segment tapering away from the partial spherical segment at a first angle, and a second frustoconical segment positioned adjacent a second end of the partial spherical segment, an outer surface of the second frustoconical segment tapering away from the partial spherical segment at a second angle, and a first groove and a second groove spaced axially apart along the longitudinal axis, the first groove positioned on a first side of the longitudinal midpoint of the partial spherical segment, the second groove positioned on a second side of the longitudinal midpoint of the partial spherical segment opposite the first side, the first groove receiving a first seal and the second groove receiving a second seal, each groove of the first and second grooves having an inner wall and an outer wall.

Aspect 22: The flexible joint according to aspect 21, wherein:

the first groove is positioned adjacent the partial spherical segment, the first groove is positioned adjacent the first frustoconical segment, the second groove is positioned adjacent the partial spherical segment, and the second groove is positioned adjacent the second frustoconical segment.

Aspect 23: The flexible joint according to aspect 21, wherein the first groove and the second groove are positioned within the partial spherical segment.

Aspect 24: The flexible joint according to aspect 21, wherein the first groove is positioned within the first frustoconical segment, and the second groove is positioned within the second frustoconical segment.

Aspect 25: The flexible joint according to any of aspects 21-24, wherein the partial spherical segment has a center point that lies on the longitudinal axis.

Aspect 26: The flexible joint according to any of aspects 21-25, wherein the first and second angles of the first and second frustoconical segments of the outer surface of the first ring are measured relative to axes parallel to the first longitudinal axis and the first and second angles of the first and second frustoconical segments of the outer surface of the second ring are measured relative to axes parallel to the second longitudinal axis.

Aspect 27: The flexible joint according to any of aspects 21-26, wherein the first coupling comprises a first projection extending towards the outer surface of the first ring and a second projection extending towards the sleeve, the second coupling comprises a first projection extending towards the outer surface of the second ring and a second projection extending towards the sleeve, the first projection of the first coupling engageable with the first ring, the first projection of the second coupling engageable with the second ring, and the second projections of the first and second couplings engageable with the sleeve.

Aspect 28: The flexible joint according to aspect 27, wherein the sleeve has an outer surface and a first recess defined within the outer surface to receive the second projection of the first coupling and a second recess defined within the outer surface to receive the second projection of the second coupling.

Aspect 29: The flexible joint according to aspect 27 or aspect 28, wherein each of the first and second couplings further comprises at least one channel positioned between the first projection and the second projection, the at least one channel having a surface facing toward the ring and the sleeve.

Aspect 30: The flexible joint according to aspect 29, wherein the at least one channel of the first coupling comprises a first channel configured to receive a first portion of the sleeve and a second channel defining a pocket, and the at least one channel of the second coupling comprises a first channel configured to receive a second portion of the sleeve and a second channel defining a pocket.

Aspect 31: The flexible joint according to aspect 30, wherein the outer surface of the first ring further comprises at least one flange extending circumferentially around the outer surface of the first ring and extending transversely to the first longitudinal axis, and the outer surface of the second ring further comprises at least one flange extending circumferentially around the outer surface of the second ring and extending transversely to the second longitudinal axis.

Aspect 32: The flexible joint according to aspect 31, wherein the flange of the first ring is positioned to extend into the pocket of the first coupling, and the flange of the second ring is positioned to extend into the pocket of the second coupling.

Aspect 33: The flexible joint according to aspect 32, wherein the flange of the first ring has a height, a width, and a shape that enable the flange of the first ring to contact the surface of the second channel of the first coupling to limit movement of the sleeve relative to the first ring, and the flange of the second ring has a height, a width, and a shape that enable the flange of the second ring to contact the surface of the second channel of the second coupling to limit movement of the sleeve relative to the second ring.

Aspect 34: The flexible joint according to any of aspects 21-33, wherein the first coupling is adapted to couple with at least one first locking device, and the second coupling is adapted to couple with at least one second locking device.

Aspect 35: The flexible joint according to aspect 34, wherein the first coupling comprises a plurality of first openings, wherein each first opening of the plurality of first openings is adapted to receive a fastener to couple a locking device of the at least one first locking device to the first coupling, and the second coupling comprises a plurality of second openings, wherein each second opening of the plurality of second openings is adapted to receive a fastener to couple a locking device of the at least one second locking device to the second coupling.

Aspect 36: The flexible joint according to aspect 34 or aspect 35, wherein the outer surface of the first ring further comprises a depression adapted to receive a portion of the first locking device, and the outer surface of the second ring further comprises a depression adapted to receive a portion of the second locking device, wherein upon receiving the portion of the first locking device and the second locking device, the sleeve is prevented from moving with respect to the first and second rings.

Aspect 37: The flexible joint according to aspect 29, wherein the outer surface of the first ring further comprises a stiffening ring projecting outwardly away from the first longitudinal axis and extending circumferentially around the outer surface of the first ring, the outer surface of the second ring further comprises a stiffening ring projecting outwardly away from the second longitudinal axis and extending circumferentially around the outer surface of the second ring, wherein the stiffening rings are positioned adjacent to respective depressions.

Aspect 38: The flexible joint according to any of aspects 21-37, wherein each coupling of the first and second couplings comprises a plurality of segments coupled end to end.

Aspect 39: The flexible joint according to aspect 38, wherein each segment of the plurality of segments comprises an attachment member extending from each end, wherein the plurality of segments of respective first and second couplings are coupled end to end via at least one fastener extending through corresponding attachment members.

Aspect 40: The flexible joint according to any of aspects 21-39, wherein the partial spherical segment subtends a third angle. All of the embodiments of the claimed disclosure described herein are provided expressly by way of example only.

Innumerable variations and modifications may be made to the example embodiments described herein without departing from the concept of this disclosure. Additionally, the scope of this disclosure is intended to encompass any and all modifications and combinations of all elements, features, and aspects described in the specification and claims, and shown in the drawings. Any and all such modifications and combinations are intended to be within the scope of this disclosure.

What is claimed is:

1. A flexible joint, said flexible joint comprising:
a ring surrounding a longitudinal axis and having an outer surface and first and second ends oppositely disposed, said first end of said ring attachable to an end of a center spool;
a sleeve surrounding at least a portion of said outer surface of said ring and having an inner surface slidably engageable with a section of said portion of said outer surface of said ring, said portion of said outer surface including said second end of said ring; and
a coupling configured to attach said sleeve to said ring;
wherein
said portion of said outer surface comprises:
a partial spherical segment having a longitudinal midpoint,
a first frustoconical segment positioned adjacent a first end of said partial spherical segment, an outer surface of said first frustoconical segment tapering away from said partial spherical segment at a first angle,
a second frustoconical segment positioned adjacent a second end of said partial spherical segment, an outer surface of said second frustoconical segment tapering away from said partial spherical segment at a second angle, and
a first groove and a second groove spaced axially apart along said longitudinal axis, said first groove positioned on a first side of said longitudinal midpoint of said partial spherical segment, said second groove positioned on a second side of said longitudinal midpoint of said partial spherical segment opposite said first side, said first groove receiving a first seal and said second groove receiving a second seal, each groove of said first and second grooves having an inner wall and an outer wall.

2. The flexible joint according to claim 1, wherein:
said first groove is positioned adjacent said partial spherical segment,
said first groove is positioned adjacent said first frustoconical segment,
said second groove is positioned adjacent said partial spherical segment, and
said second groove is positioned adjacent said second frustoconical segment.

3. The flexible joint according to claim 1, wherein said first groove and said second groove are positioned within said partial spherical segment.

4. The flexible joint according to claim 1, wherein said first groove is positioned within said first frustoconical segment, and said second groove is positioned within said second frustoconical segment.

5. The flexible joint according to claim 1, wherein said partial spherical segment has a center point that lies on said longitudinal axis.

6. The flexible joint according to claim 1, wherein said first and second angles are measured relative to axes parallel to said longitudinal axis.

7. The flexible joint according to claim 1, wherein said coupling comprises a first projection extending towards said outer surface of said ring and a second projection extending towards said sleeve, said first projection engageable with said ring and said second projection engageable with said sleeve.

8. The flexible joint according to claim 7, wherein said sleeve has an outer surface and a recess defined within said outer surface to receive said second projection.

9. The flexible joint according to claim 7, wherein said coupling further comprises at least one channel positioned between said first projection and said second projection, said at least one channel having a surface facing toward said ring and said sleeve.

10. The flexible joint according to claim 9, wherein said at least one channel comprises a first channel configured to receive a portion of said sleeve and a second channel defining a pocket.

11. The flexible joint according to claim 10, wherein said outer surface of said ring further comprises at least one flange extending circumferentially around said outer surface and extending transversely to said longitudinal axis.

12. The flexible joint according to claim 11, wherein said flange is positioned to extend into said pocket of said coupling.

13. The flexible joint according to claim 12, wherein said flange has a height, a width, and a shape that enable said flange to contact said surface of said second channel to limit movement of said sleeve relative to said ring.

14. The flexible joint according to claim 1, wherein said coupling is adapted to couple with at least one locking device.

15. The flexible joint according to claim 14, wherein said coupling comprises a plurality of openings, wherein each opening of said plurality of openings is adapted to receive a fastener to couple a locking device of said at least on locking device to said coupling.

16. The flexible joint according to claim 14, wherein said outer surface of said ring further comprises a depression adapted to receive a portion of said locking device, wherein upon receiving said portion of said locking device, said sleeve is prevented from moving with respect to said ring.

17. The flexible joint according to claim 16, wherein said outer surface of said ring further comprises a stiffening ring projecting outwardly away from said longitudinal axis and extending circumferentially around said outer surface, wherein said stiffening ring is positioned adjacent said depression.

18. The flexible joint according to claim 1, wherein said coupling comprises a plurality of segments coupled end to end.

19. The flexible joint according to claim 18, wherein each segment of said plurality of segments comprises an attachment member extending from each end, wherein said plurality of segments are coupled end to end via at least one fastener extending through corresponding attachment members.

20. The flexible joint according to claim 1, wherein said partial spherical segment subtends a third angle.

\* \* \* \* \*